US006265100B1

United States Patent
Saaski et al.

(12)

(10) Patent No.: US 6,265,100 B1
(45) Date of Patent: Jul. 24, 2001

(54) RECHARGEABLE BATTERY

(75) Inventors: Elric W. Saaski, Bothell, WA (US); Boone B. Owens, Wrightsville Beach, NC (US); Stefano Passerini, Minneapolis, MN (US)

(73) Assignee: Research International, Inc., Woodinville, WA (US)

( * ) Notice: Subject to any disclaimer, the term of this patent is extended or adjusted under 35 U.S.C. 154(b) by 0 days.

(21) Appl. No.: 08/942,963

(22) Filed: Feb. 23, 1998

(51) Int. Cl.$^7$ ...................................................... H01M 2/00
(52) U.S. Cl. .......................... 429/163; 429/176; 429/164; 429/161
(58) Field of Search ..................................... 381/322, 323, 381/324, 328, 330, 137, 135, 133, 127; 429/163, 164, 175, 176, 94, 161, 209, 186

(56) References Cited

U.S. PATENT DOCUMENTS

| 2,901,551 | 8/1959 | Passow ................................. 179/107 |
| 2,950,357 | 8/1960 | Mitchell et al. ...................... 179/107 |

(List continued on next page.)

FOREIGN PATENT DOCUMENTS

WO 93/18629   9/1993   (WO) .............................. H04R/25/00

OTHER PUBLICATIONS

Long Life, Rechargeable Hearing Aid; Owens, Boone B.; Aug. 14, 1995; pp. 1–72; Small Business Research Program, Phase II Grant Application.

A Perspective On Batteries For High Power Hearing Instruments; Dopp et al.; The Hearing Review; 6/96; pp. 42 and 45.

Handbook Of Batteries, Second Edition; Linden; 1995; entire book. no month.

The Hearing Aid Battery: A Hazard To Elderly Patients; Strachan et al.; Age And Aging; 1994; vol. 23; pp. 425–426. no month.

Design Evolution Of Defibrillator Batteries; Takeuchi; Proceedings of The 6th Annual Battery Conference On Applications and Advances, Jan. 15–17, 1991; Paper 91BM–1, pp. IV–1 to 9.

The Rechargeable Hearing Instrument System; Gitles et al.; Hearing Instruments; vol. 38, No. 7, 1987; pp. 3–5. no month.

(List continued on next page.)

*Primary Examiner*—Gabrielle Brouillette
*Assistant Examiner*—R. Alejandro
(74) *Attorney, Agent, or Firm*—Gregory W. Moravan

(57) ABSTRACT

A contactless rechargeable hearing aid system in which a rechargeable hearing aid may be optically or inductively recharged by an optical or an inductive recharger. The optically rechargeable hearing aid may have a dual purpose optical fiber that may act as a light conduit for the recharging light, and that may also act as a draw string for the hearing aid. The rechargeable hearing aid may use a high energy nickel metal-hydride rechargeable battery or a high energy, high voltage lithium based rechargeable battery, in conjunction with a DC to DC voltage regulating circuit for converting the rechargeable battery's declining DC output voltage to the fixed DC input voltage needed by the hearing aid's audio related circuitry. The DC to DC voltage regulating circuit may also help to present a supply impedance that matches the input impedance of the audio related circuitry in the hearing aid. The rechargeable battery may have an alternately folded cell stack, a spiral wound cell stack or an accordion folded cell stack, in order to provide, in a minimized volume, the large anode, cathode and electrolyte areas that may be needed to reduce the rechargeable battery's output impedance, in order to help reduce internal resistance losses during use of the battery.

20 Claims, 14 Drawing Sheets

U.S. PATENT DOCUMENTS

| | | | |
|---|---|---|---|
| 3,007,110 | 10/1961 | Rosenstrach | 324/53 |
| 3,272,653 | 9/1966 | Solomon et al. | 136/6 |
| 3,764,748 * | 10/1973 | Branch et al. | 179/107 E |
| 3,818,691 | 6/1974 | Uchiyama | 58/23 |
| 3,844,840 | 10/1974 | Bender | 136/89 |
| 3,921,049 | 11/1975 | Mellors et al. | 320/2 |
| 3,993,501 * | 11/1976 | Kalkoni-Kis | 429/48 |
| 4,087,960 | 5/1978 | Koichi . | |
| 4,293,808 | 10/1981 | Varadi et al. . | |
| 4,379,988 | 4/1983 | Mattatall . | |
| 4,800,803 | 1/1989 | Farmont . | |
| 4,882,239 | 11/1989 | Grimmer et al. . | |
| 4,948,685 | 8/1990 | Ohsawa et al. . | |
| 5,210,804 | 5/1993 | Schmid . | |
| 5,253,300 | 10/1993 | Knapp . | |
| 5,279,292 | 1/1994 | Baumann et al. . | |
| 5,303,305 | 4/1994 | Raimo et al. . | |
| 5,303,306 | 4/1994 | Brillhart et al. . | |
| 5,316,875 | 5/1994 | Murai et al. . | |
| 5,411,535 | 5/1995 | Fujii et al. . | |
| 5,411,537 | 5/1995 | Munshi et al. . | |
| 5,455,999 | 10/1995 | Weiss et al. . | |
| 5,525,441 | 6/1996 | Reddy et al. . | |
| 5,567,548 * | 10/1996 | Walk et al. | 429/218 |
| 5,580,683 * | 12/1996 | Takeuchi et al. | 429/194 |
| 5,610,494 | 3/1997 | Grosfilley . | |
| 5,618,318 | 4/1997 | Reddy et al. . | |
| 5,646,815 | 7/1997 | Owens et al. . | |
| 5,693,105 | 12/1997 | Kawakami . | |
| 5,807,645 * | 9/1998 | Takeuchi et al. | 429/218 |
| 5,879,836 * | 3/1999 | Ikeda et al. | 429/231.8 |

OTHER PUBLICATIONS

Lithium Ion Rechargeable Batteries; Megahed et al.; Journal Of Power Sources; vol. 51, 1994; pp. 79–104.

Sound Advice; Jul. 1995; Magnatone; pp. 1–2.

Sound Advice; May/Jun. 1997; Magnatone; pp. 1–6.

Sound Advice; Jul./Aug. 1997; Magnatone; pp. 1–6.

Sound Advice; Sep./Oct. 1992; Magnatone; pp. 1–6.

Sound Advice; Nov./Dec. 1997; Magnatone; pp. 1–6.

Nickel–Metal Hydride Batteries; Leclanch; 1996; Brochure, pp. 1 to 6.

Hearing Aid Battery Sheet; Rayovac; 1/95; Brochure; pp. 1–7.

Liberty; Magnatone; 4/93; Brochure; pp. 1–7.

Mineature Rechargeable Batteries; Plainview Batteries; 7/94; Brochure; pp. 1–6.

* cited by examiner

RECHARGEABLE BATTERY

STATEMENT REGARDING FEDERALLY SPONSORED RESEARCH AND DEVELOPMENT

The U.S. Government may have a paid-up license in this invention and may have the right in limited circumstances to require the patent owner to license others on reasonable terms, as may be provided for by the terms of Contract or Grant Number 2-R44-AG12711-02 awarded by the National Institute On Aging.

STATEMENT REGARDING FEDERALLY SPONSORED RESEARCH AND DEVELOPMENT

The U.S. Government may have a non-exclusive, nontransferable, irrevocable, paid-up license to practice or have practiced for or on behalf of the United States the invention described in this patent application and in any and all divisions, continuations, and continuations in part, and in any and all patents and re-issues granted thereon throughout the world, and may have other rights in the invention, as may be provided by the terms of Grant/Contract No. 5 R44 AG 12711-03 awarded by the Public Health Service/National Institutes Of Health.

BACKGROUND OF THE INVENTION

The present invention relates to hearing aids. More particularly, it may relate to a hearing aid system that may comprise a charger and a rechargeable hearing aid; wherein the hearing aid may be optically or inductively recharged.

The rechargeable hearing aid may utilize any conventional rechargeable battery. However, preferably, the rechargeable hearing aid may utilize a high energy rechargeable battery that may comprise at least one high energy rechargeable cell, such as: (a) a NiMH (nickel metal-hydride) rechargeable cell; or (b) a lithium based rechargeable cell.

As used herein, the generic term "lithium based rechargeable cell (or battery)" may be defined as an aqueous or non-aqueous cell or battery in which at least one of the Faradaic half cell reactions includes lithium ions as reactants and/or products. In this context, non-aqueous means that the electrolyte does not contain a significant amount of water. In addition, as used herein, the "lithium based rechargeable cell (or battery)" may be classified as either a lithium rechargeable cell (or battery) (i.e., one having a lithium metal or a lithium alloy anode); or as a lithium-ion rechargeable cell (or battery) (i.e., one having no significant amounts of metallic lithium in its anode). Further, the lithium based rechargeable cell (or battery) may have a solid electrolyte in the form of a polymer or gel; and the lithium-ion rechargeable cell (or battery) may have either a liquid electrolyte, or a solid electrolyte in the form of a polymer or gel. In this context, the polymer electrolyte may be either a true polymer, or the polymer may be plasticized or gelled with the addition of at least one low molecular weight organic liquid.

The materials and the chemical reactions in the high energy NiMH and lithium based rechargeable cells and batteries described herein are all conventional.

However, each improved, high energy, rechargeable battery that is described herein may have a novel cell stack design for maximizing the surface area of its cathode and anode, to reduce the battery's impedance, while simultaneously minimizing the battery's overall size or volume. The rechargeable hearing aid may be provided with a DC to DC voltage regulating circuit to help match the high energy rechargeable battery's output voltage the input voltage required by the hearing aid's audio amplifier and related circuitry, and to help provide high current during transients due to loud sounds.

SUMMARY OF THE INVENTION

In the United States alone, about five to eight million people use hearing aids. The vast majority of those hearing aids are powered by disposable batteries. Since disposable hearing aid batteries may have, on the average, a life of from about one to two weeks, the typical hearing aid user may use about 30 disposable batteries per year. As a result, about 150 million to 240 million disposable hearing aid batteries may be used each year in the United States alone.

However, the use of disposable hearing aid batteries may present many major problems. One problem may be that hearing aids using disposable batteries may have exposed battery contacts in their battery compartments, in order to make electrical contact with the disposable batteries. But if those exposed battery contacts become bent or dirty; or if they become corroded, such as due to leakage from the disposable batteries, the hearing aid may not function properly, or may not function at all, until costly repairs are made.

Another problem with using disposable hearing aid batteries may be that during replacement of the millions of disposable batteries used each year, a great number of the hearing aids involved may suffer damage to the hearing aid's battery compartment door, battery contacts, or other components; or the hearing aid may even be completely ruined, such as if it is accidentally dropped on a hard surface. Besides being costly, such damage may also cause the user great inconvenience or hardship, by depriving the user of the use of the hearing aid until it is repaired or replaced.

Disposable hearing aid batteries may also be a problem in that they may cause substantial difficulty and stress to the elderly, who constitute the vast majority of the users of hearing aids, and who may lack the manual dexterity, visual acuity, or skill needed to be able to easily replace the hearing aid batteries on their own.

A further problem with disposable hearing aid batteries is that they may cause adverse environmental consequences unless they are properly disposed of.

Disposable hearing aid batteries may also be a problem in that they are relatively costly. They are not only relatively costly to purchase, but they may also be relatively costly to properly dispose of when expended, in order to avoid adverse environmental consequences.

A further problem presented by disposable hearing aid batteries may be that the millions of disposable batteries that are discarded each year may present millions of chances each year for a small child to harm himself, or herself, by accidentally swallowing the battery, or by inserting it into his or her nose or ear.

Conventional rechargeable hearing aids using rechargeable NiCd (nickel cadmium) batteries have not been a commercial success, despite the relatively low cost of such batteries and their ability to deliver the high current pulses that may be required by hearing aids.

The lack of commercial success may be due to the fact that there may be many problems with conventional hearing aids using NiCd rechargeable batteries. One problem may be that such rechargeable hearing aids may have external electrical contacts for receiving electrical energy from an external power supply to recharge the NiCd battery. Such external electrical contacts may be prone to poor performance, or even failure, due to becoming dirty or corroded since the hearing aid may be exposed to harsh environmental factors, such as the user's perspiration.

A further problem with using rechargeable NiCd batteries in hearing aids may be that although rechargeable NiCd hearing aid batteries have been made small enough for BTE (behind the ear) and for some ITE (in the ear) hearing aids, it has not been possible to produce commercially successful, highly miniaturized rechargeable NiCd batteries suitable for use in the highly popular ITC (in the canal) and CIC (completely in the canal) hearing aids. This is because a conventional NiCd hearing aid battery that was small enough to fit in an ITC or CIC hearing aid would likely not store enough energy to provide the hearing aid with a sufficient number of hours of use between charges.

Using rechargeable NiCd hearing aid batteries may also be a problem in that they may have a relatively short cycle life (i.e., the number of times the battery can go through its discharge/recharge cycle). For example, although the cycle life of a NiCd hearing aid battery may vary widely depending on how it is used and recharged, it may have a useful life of only a few hundred cycles, or less, before its energy storage capacity becomes too small to be satisfactory. As a result, rechargeable NiCd hearing aid batteries may need to be replaced more frequently than may be desirable, since an ideal rechargeable hearing aid battery would have a cycle life sufficient for it to last the normal expected life of the hearing aid with which it is used.

In addition, rechargeable NiCd hearing aid batteries may have the further problem of suffering from a loss in their energy storage capacity after they have been in use for a while, due to what is known as their discharge "memory". That is, if a rechargeable NiCd hearing aid battery is only partially discharged before being recharged, the result may be that it is only possible to discharge the battery to its earlier partial discharge point, rather than it being possible to discharge the battery to the full discharge capacity it had when it was new.

Another problem with rechargeable NiCd hearing aid batteries may be that they have a relatively low energy capacity per unit volume. This means that such batteries may have an insufficient capacity to store a given, needed amount of energy, particularly if they are to be used in ITC or CIC hearing aids.

Turning now to the present invention, one of its aspects may be to provide a rechargeable hearing aid system that does not need any electrical contacts on the external surface of the hearing aid in order to recharge the hearing aid's rechargeable battery. Accordingly, the rechargeable hearing aid system of the present invention may comprise an optical charger that may be optically coupled to an optically rechargeable hearing aid having a rechargeable battery; wherein energy may be transferred from the optical charger to the optically rechargeable hearing aid by the use of light, rather than by the use of electrical contacts.

The optical charger may comprise a light source and a hearing aid holder. The optically rechargeable hearing aid may comprise a housing having a window that is transparent to the light emitted by the light source (such as visible or infrared (IR) light, for example); and may further comprise a photovoltaic cell for converting the light received from the light source into electrical energy for recharging the hearing aid's rechargeable battery. The charger's hearing aid holder may hold the hearing aid in such a way that the light source and the photovoltaic cell are properly positioned with respect to each other during the recharging process.

As is known, many CIC hearing aids may have a drawstring to help enable the user to easily remove the hearing aid from his or her ear when desired.

Accordingly, one aspect of the present invention may be to provide an optically rechargeable hearing aid that may further comprise an optical fiber: (a) that may serve as a draw string for helping to remove the hearing aid from the user's ear; and/or (b) that may serve as a conduit for helping to transport light from the charger's light source to the hearing aid's photovoltaic cell.

A further aspect of the present invention may be to provide an optically rechargeable hearing aid that comprises a photovoltaic cell having output voltage, output current, and output power curves that are highly suited for recharging the high energy NiMH and lithium based rechargeable batteries that are described herein.

Another aspect of the present invention may be to provide an alternative, non-optical, hearing aid system that also does not need any electrical contacts on the external surface of the hearing aid in order to recharge the hearing aid's rechargeable battery. Accordingly, the rechargeable hearing aid system of the present invention may comprise an inductive charger that may be inductively coupled to an inductively rechargeable hearing aid having a rechargeable battery; wherein energy may be transferred from the charger to the hearing aid by the use of inductive transfer, rather than by the use of electrical contacts.

The inductive charger may comprise an inductive transmitting circuit and a hearing aid holder; while the inductively rechargeable hearing aid may comprise an inductive receiving circuit. During use of such a rechargeable hearing aid system, the inductive transmitting and receiving circuits may be inductively coupled to each other, to permit electrical energy from the inductive transmitting circuit to be inductively transferred to the inductive receiving circuit. Electrical energy induced in the inductive receiving circuit may then be used for recharging the hearing aid's rechargeable battery. The charger's hearing aid holder may hold the hearing aid in such a way that the inductive transmitting circuit and the inductive receiving circuit are properly positioned with respect to each other.

As was explained above, existing NiCd rechargeable batteries for hearing aids suffer numerous drawbacks. Accordingly, one aspect of the present invention may be to provide a superior, high energy rechargeable battery that may at least partially achieve one or more of the following goals, as a minimum, due to such factors as its electrode(s)/electrolyte(s) design and its lower recharge voltage limit: (a) to have a relatively high energy capacity, i.e., an energy capacity sufficient so that the battery need not be recharged more than about once per day during normal use of the hearing aid; (b) to have a relatively low output impedance, to help avoid a drop in the battery's output voltage when the battery is under load, such as when it is connected to the hearing aid's audio amplifier and related circuitry; (c) to be highly compact, so that it may be small enough for use in even ITC and CIC hearing aids; and/or (d) to have a relatively long cycle life, i.e., a cycle life of at least about 1,000 to 1,500 discharge/recharge cycles (equal to at least about 3 to 5 years of normal use).

All of the above goals may be at least partially achieved by the use of the novel, high energy, NiMH and lithium based rechargeable batteries that are disclosed herein.

Because of the materials used in them, the NiMH and the lithium based rechargeable batteries disclosed herein may inherently have an energy capacity per unit of volume that may be several times that of conventional NiCd rechargeable hearing aid batteries, especially after numerous discharge/recharge cycles.

The goal of trying to provide a lithium based rechargeable battery that has a relatively low impedance may present a rather difficult task to achieve, in view of the fact that lithium based rechargeable batteries may tend to inherently have a relatively high impedance, due to the materials used in them. This significant problem may be at least partially overcome by providing a lithium based rechargeable battery comprising elements (i.e., a least one anode, cathode, and layer of electrolyte), that may have a relatively large surface area since, in general, the battery's impedance may be inversely proportional to the surface area of its elements.

However, providing a lithium based rechargeable battery that may have a relatively low impedance (due to its elements having a relatively large surface area), seems at first blush to be mutually exclusive with the goal of providing a lithium based rechargeable battery that may be highly compact. This major problem may be at least partially overcome by making the battery's elements into very thin, long strips; and by then: (a) alternately folding the strips over each other to form a highly compact alternately folded cell stack; (b) by forming the strips into a cell sandwich that may then be rolled up to form a spiral wrapped (i.e., jelly-roll) cell stack; or (c) by forming the strips into a cell sandwich that may then be accordion folded into a highly compact accordion folded cell stack.

Another goal of the present invention may be to provide a remarkably compact lithium based rechargeable battery.

In particular, the lithium based rechargeable battery 160 of FIGS. 10–12 having an alternately folded cell stack 172 may have an external volume of less than about 10 cubic centimeters. In addition, the ratio of the area of the battery 160's two largest external faces that are at least generally parallel to each other, (e.g., the cover 178 and the base of the can 163), to the area of the remainder of the entire external surface area of the battery 160 (e.g. the sidewall of the can 163), may be greater than about 0.5.

Similarly, the lithium based rechargeable battery 160a of FIGS. 13–15 having a spiral wrapped cell stack 198 may have an external volume of less than about one cubic centimeter. In addition, the ratio of the area of the battery 160a's two largest external faces that are at least generally parallel to each other, (e.g., the cover 178a and the base of the can 163a), to the area of the remainder of the entire external surface area of the battery 160a (e.g. the sidewall of the can 163a), may be greater than about 0.5.

Similarly, the lithium based rechargeable battery 160b of FIGS. 16–19 having an accordion folded cell stack 216 may have an external volume of less than about one cubic centimeter. In addition, the ratio of the area of the battery 160b's two largest external faces that are at least generally parallel to each other, (e.g., the cover 178b and the base of the can 163b), to the area of the remainder of the entire external surface area of the battery 160b (e.g. the sidewall of the can 163b), may be greater than about 0.5.

Optimum performance of any hearing aid may not be achieved unless it's audio amplifier and related circuitry are provided with a power source having the proper DC output voltage and a low output impedance. However, using the lithium based rechargeable batteries that are disclosed herein may present major problems if their use in many conventional hearing aids is attempted.

One such problem may be that the audio amplifier and related circuits of many conventional hearing aids on the market today may typically require a relatively constant input voltage of about 1.2 volts. But the lithium based rechargeable batteries disclosed herein may have output voltages in the range of from about 2.0 to about 4.5 volts when fully charged; and their output voltages may not be constant, since their output voltages may decline with time as they are discharged.

A further problem with using the lithium based rechargeable batteries disclosed herein with such conventional hearing aids is that their audio amplifier and related circuits may be designed for a power source with an impedance in the range of a few ohms to a few tens of ohms to meet high fidelity goals; while the impedance of the lithium based rechargeable batteries disclosed herein may be in the range of from about 5 to about 100 ohms.

Accordingly, an aspect of the present invention may be to provide a suitable DC to DC voltage regulating circuit between the lithium based rechargeable batteries disclosed herein and the audio amplifier and related circuitry of the hearing aid in which they may be used. Such a DC to DC voltage regulating circuit may serve three tasks simultaneously. First, it may provide the desired output DC voltage level, such as 1.2 volts, despite the fact that its input voltage from the lithium based rechargeable batteries may be at a considerably higher voltage level. Second, it may provide a relatively constant output voltage at the desired voltage level, despite the fact its input voltage from the lithium based rechargeable batteries may decline over time as the batteries are discharged. Third, it may help to provide a low power supply impedance to the hearing aid's audio amplifier and related circuitry.

An aspect of the present invention may be to provide such a DC to DC voltage regulating circuit comprising inductive and/or capacitive energy transfer.

Alternatively, such a DC to DC voltage regulating circuit may not be needed if the hearing aid's rechargeable battery comprises a NiMH rechargeable battery having an output voltage of about 1.2 volts.

It should be understood that the foregoing summary of the present invention does not set forth all of its features, advantages, characteristics, structures, methods and/or processes; since these and further features, advantages, characteristics, structures, methods and/or processes of the present invention will be directly or inherently disclosed to those skilled in the art to which it pertains by all of the disclosures herein.

DESCRIPTION OF THE PREFERRED EMBODIMENTS
OPTICALLY RECHARGEABLE HEARING AID SYSTEM

Figure 1:
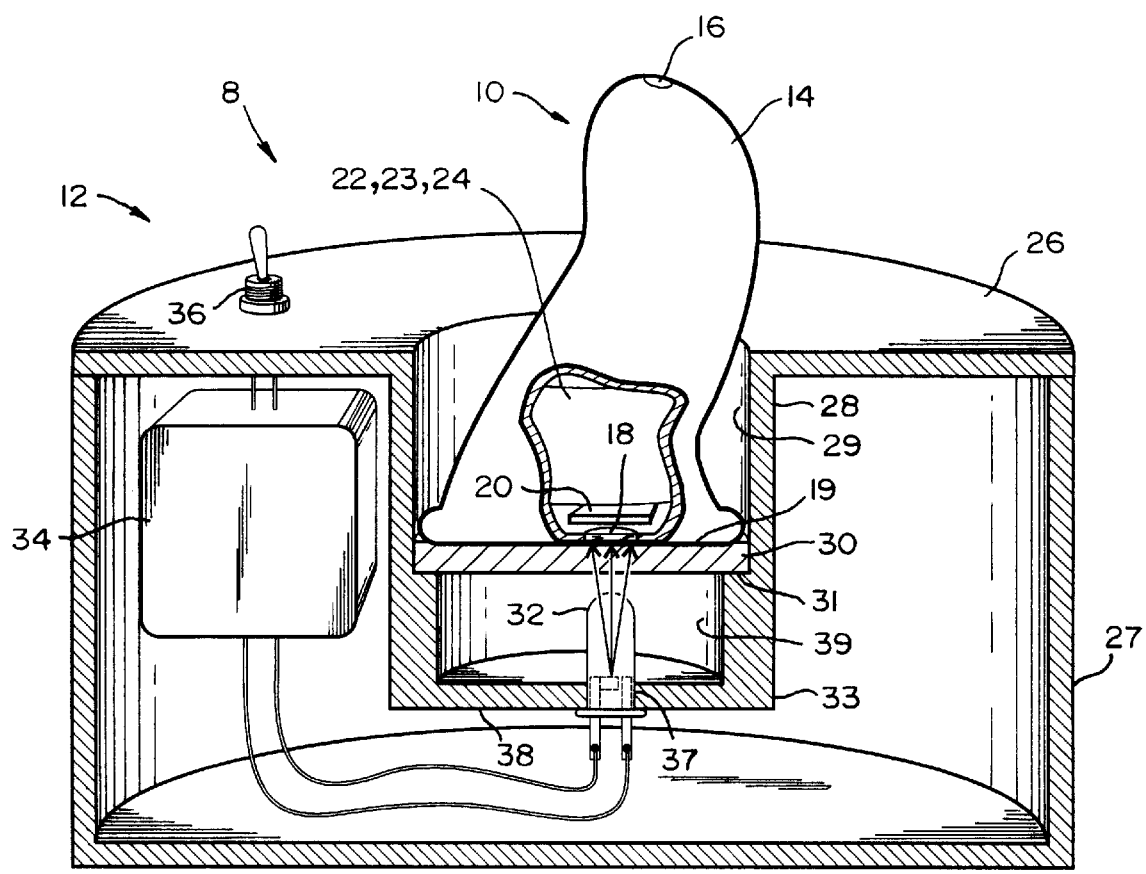
FIG. 1 is a perspective view, partially in cross-section and partially broken away, of a first embodiment of the optically rechargeable hearing aid system of the present invention.

Referring now to FIG. 1, an optically rechargeable hearing aid system 8 is illustrated that may comprise an optically rechargeable hearing aid 10 and an optical charger 12. It should be noted that although the system 8 is illustrated and described herein with respect to optically recharging an optically rechargeable hearing aid 10, the disclosures herein may be applied to optically recharging any battery powered device having a rechargeable battery, such as a pager or a cellular telephone.

The optically rechargeable hearing aid 10 may comprise a shell 14 having a sound opening 16 in its upper end, and an optical window 18 in its base 19. The hearing aid 10 may further comprise a photovoltaic cell 20; a battery management circuit 22; a DC to DC voltage regulating circuit 23; and a rechargeable battery 24. Although only one photovoltaic cell 20 is illustrated, there may be more than one cell 20. Similarly, although only one battery 24 is illustrated, there may be more than one battery 24.

Although not illustrated in FIG. 1, for clarity, the hearing aid 10 may also comprise such conventional elements as a microphone, a signal processor, an audio amplifier, related electrical circuitry, and a loudspeaker, as is known in the art.

The shell 14 may have any suitable external form, such as that of any conventional ITC hearing aid, like that illustrated in FIG. 1. Alternatively, the external form of the shell 14 may be that of any conventional BTE, ITE, or CIC hearing aid.

The charger 12 may comprise a cover 26 releasably secured to a base 27; a hollow hearing aid holder 28; a seat 30; a light source 32; a hollow light source holder 33; a power supply 34 for the light source 32; and an on/off switch 36 for the power supply 34. Although the charger 12 is illustrated as being relatively small and having a generally cylindrical shape, it may have any other suitable size and shape.

Instead of the switch 36, the charger 12 may alternatively include sensor/switch circuitry for automatically turning on the power supply 34 when the hearing aid 10 is placed in the holder 28, and for automatically turning off the power supply 34 when the hearing aid 10 is removed from the holder 28. Any suitable conventional sensor/switch circuitry may be used, such as circuitry using a photointerruptor, or a magnetic Hall effect sensor.

The power supply 34 may be supplied with power from any suitable external electrical power source. If the power from the external electrical power source is not suitable for directly powering the light source 32 and any other electrical components that may comprise a part of the charger 12, then the power supply 34 may comprise any conventional electrical circuitry that may be needed for converting its input power into the power needed by the light source 32 and by any other electrical components that may comprise a part of the charger 12.

Alternatively, the power supply 34 may comprise at least one disposable or rechargeable battery that may be located within the charger 12. If the power delivered by the battery is not suitable for directly powering the light source 32 and any other electrical components that may comprise a part of the charger 12, then the power supply 34 may further comprise any conventional electrical circuitry that may be needed for converting its input battery power into the power needed by the light source 32 and any other electrical components that may comprise a part of the charger 12.

The hearing aid holder 28 may comprise a hearing aid cavity 29, sized to receive the hearing aid 10; and an annular shoulder 31, on which the seat 30 may rest, and to which the seat 30 may be mounted.

The cross-sectional size and shape of the hearing aid cavity 29 in the holder 28 may closely correspond to the size and shape of the hearing aid's base 19. If the base 19 is not circular, which may typically be the case, the hearing aid 10 may fit into the hearing aid cavity 29 in only one orientation, thereby automatically aligning the light source 32 and the photovoltaic cell 20 with respect to each other during use of the charger 12.

On the other hand, if the hearing aid's base 19 is circular, then the holder 28's hearing aid cavity 29 may be cylindrical. In such a case the light source 32 and the photovoltaic cell 20 may be located on the longitudinal axis of the cavity 29, in order to automatically align the light source 32 and the photovoltaic cell 20 with respect to each other during use of the charger 12.

Gravity alone may hold the hearing aid 10 in the hearing aid cavity 29. Alternatively, the cavity 29 may be sized to enable the holder 28 to have a friction fit with the hearing aid 10, or any other suitable securing means may be used to hold the hearing aid 10 in the cavity 29 during use of the charger 12.

The location of the seat 30 may be selected with respect to the top surface of the cover 26 so that when the hearing aid 10 is inserted into the hearing aid cavity 29 a substantial portion of the hearing aid 10 may extend above the top surface of the cover 26, as seen in FIG. 1. This may enable the hearing aid 10 to be easily grasped, and removed from the charger 12 by the user.

The light source holder 33 may comprise a bottom wall 38; a bottom wall opening 37, in which the light source 32 may be mounted in any suitable way; and a chamber 39 located between the seat 30 and the bottom wall 38. Alternatively, the chamber 39 may be partially or wholly eliminated; and the light source holder 33 may comprise an extended bottom wall 38 and an extended opening 37 that may extend partly, or all of the way, up to the seat 30.

The charger's seat 30 and the hearing aid's window 18 may be made from a material which is selected to be transparent to the light emitted from the light source 32.

Alternatively, the shell 14 may be made from a material which is selected to be transparent to the light emitted from the light source 32. In such a case, the window 18 may be eliminated, and replaced by a corresponding portion of the shell 14.

For example, the light source 32 may be selected to emit IR light, and the shell 14 may be made from a colored, heat or ultraviolet light curing polymer such as PMMA (polymethylmethacrylate), which is adequately transparent to IR light, but at the same time is opaque to at least some portion of the visible spectrum. This may be a particularly appealing option since such a shell 14 may not only eliminate the need for a window 18, but it may also conceal the contents of the hearing aid 10, for aesthetic reasons, while still permitting the IR light from the light source 32 to reach the photovoltaic cell 20.

Similarly, the hearing aid holder 28, the light source holder 33, or even the entire cover 26 may be made from a material that is selected to be transparent to the light emitted from the light source 32. In such a case the separate seat 30 may be eliminated and replaced by a corresponding portion of the hearing aid holder 28, the light source holder 33, or the cover 26. Alternatively, the seat 30 may be eliminated entirely, and the hearing aid's base 19 may sit directly on the rim 31.

The charger 12 may also comprise any suitable conventional alarm system, such as a buzzer or an external light, to alert the user when the hearing aid 10 is properly seated on the seat 30, and to alert the user when the charging of the hearing aid 10 has been completed.

Although not illustrated, for clarity, one or more lenses or other suitable means may be used to convey, focus or concentrate the light from the light source 32 onto the photovoltaic cell 20.

In order to use the optical charger 12, the hearing aid 10 is placed in the holder 28 with its base 19 on the seat 30; at which time the power supply 34 may be turned on. As seen in FIG. 1, light from the light source 32 may pass through the seat 30 and the window 18 to the photovoltaic cell 20, which converts the light to electricity. The electricity from the photovoltaic cell 20 may first be conveyed to the battery management circuit 22, and then to the battery 24. Alternatively, the battery management circuit 22 may be eliminated, and the electricity from the photovoltaic cell 20 may be conveyed directly to the battery 24.

After the hearing aid 10 has been charged, it may be removed from the charger 12 by simply grasping its upper end, which extends out of the charger 12, and pulling upwardly.

In view of the disclosures herein, it will be appreciated that the holder 28 may take on a variety of different constructions, depending on such factors as the size and shape of the particular hearing aid 10 with which the charger 12 is designed to be used. But in all cases, the functions of the holder 28 may include securely holding the hearing aid 10 in the charger 12, and properly positioning the hearing aid 10 in the charger 12 in such a way that the light source 32 and the photovoltaic cell 20 are correctly aligned with respect to each other, in order to help maximize the transfer of light from the light source 32 to the photovoltaic cell 20.

OPTICALLY RECHARGEABLE HEARING AID SYSTEM HAVING AN OPTICAL FIBER DRAW STRING

Turning now to the alternative embodiment of the optically rechargeable hearing aid system 8a that is illustrated FIG. 2, it may comprise an optically rechargeable hearing aid 10a and an optical charger 12a that may be the same as, or at least similar to, the optically rechargeable hearing aid 10 and the optical charger 12 of FIG. 1, respectively, with respect to their theory, construction and operation, except for those differences which will be made apparent by the disclosures herein.

Figure 2:
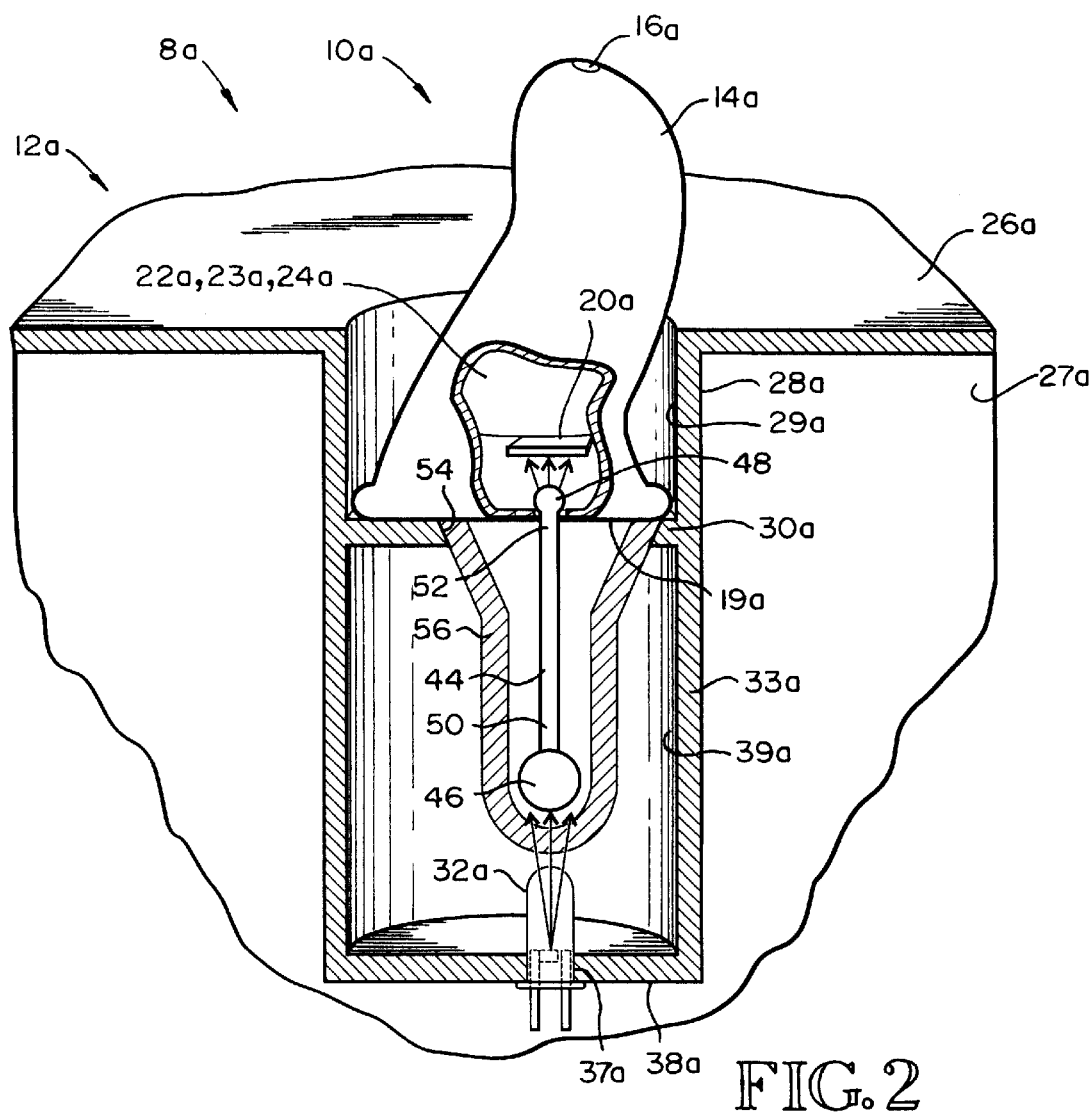
FIG. 2 is a perspective view, partially in cross-section and partially broken away, of a second embodiment thereof.

Accordingly, for clarity and simplicity, certain parts of the optically rechargeable hearing aid 10a and the optical charger 12a of the embodiment of FIG. 2 have been given the same reference numerals, with an "a" appended, as the reference numerals used for the corresponding respective parts of the optically rechargeable hearing aid 10 and the optical charger 12 of FIG. 1.

As seen in FIG. 2, the optically rechargeable hearing aid 10a may comprise an optical fiber 44. Although only a single optical fiber 44 is illustrated, there may be more than one optical fiber 44. The optical fiber 44 may typically be about 10 mm long, although it may be longer, or shorter. The optical fiber 44 may be selected to be sturdy enough to enable it to serve as a drawstring for removing the optically rechargeable hearing aid 10a from the user's ear. Non-optical fiber drawstrings for hearing aids are conventional, as is known in the art.

The optical fiber 44 may be provided with an integral lower lens 46, for focusing the light from the light source 32a into the optical fiber's input end 50; and may be provided with an integral upper lens 48, for focusing the light from the optical fiber's output end 52 onto the photovoltaic cell 20a.

Alternatively, instead of the lower and upper integral lenses 46, 48, one or more separate, non-integral lenses or other suitable means may be used to convey, focus or concentrate the light from the light source 32a onto the optical fiber's input end 50 and/or may be used to convey, focus or concentrate the light from the optical fiber's output end 52 onto the photovoltaic cell 20a.

Alternatively, the upper integral lens 48 may be eliminated, and the fiber optic's output end 52 may be bonded directly to the photovoltaic cell 20a, such as by using any suitable optical fiber adhesive. In such an event, the one or more optical fibers 44 may be selected so that the area of their output end(s) 52 is at least about equal to the area of the photovoltaic cell 20a.

The seat 30a may have an opening 54 in which a well 56 for the optical fiber 44 may be located. Alternatively, the well 56 may be eliminated. However, if a well 56 is provided, it may be a separate element that may be secured to the seat 30a in any suitable way. Alternatively, the well 56 may be integrally formed as part of the seat 30a, the hearing aid holder 28a, the light source holder 33a, or the cover 26a. The well 56 may be made from a material which is selected to be transparent to the light emitted from the light source 32a.

Alternatively, the separate well 56 may be eliminated, and may be replaced by a corresponding portion of the seat 30a, the hearing aid holder 28a, the light source holder 33a, or the cover 26a. In such a case, the seat 30a, the hearing aid holder 28a, the light source holder 33a, or even the entire cover 26a may be made from a material which is selected to be transparent to the light emitted from the light source 32a.

As an alternative to the construction illustrated in FIG. 2, the chamber 39a may be partly eliminated; and an extended bottom wall 38a and an extended opening 37a may be provided that may extend partly, or all of the way, up to the bottom of the well 56.

The charger 12a may be provided with a small sonic (vibrating) washer to clean ear wax debris from the optical fiber 44 before the fiber 44 enters the well 56. Any suitable conventional sonic washer may be used, such as one similar to those currently commercially available for the cleaning of jewelry and other small parts.

THEORETICAL CONSIDERATIONS FOR AN OPTICAL CHARGER IN AN OPTICALLY RECHARGEABLE HEARING AID SYSTEM

The theoretical considerations for designing the optical charger 12 for the optically rechargeable hearing aid 10 in the optically rechargeable hearing aid system 8 of FIG. 1 will now be addressed. The same, or similar, considerations may apply equally well to the optical charger 12a for the optically rechargeable hearing aid 10a in the optically rechargeable hearing aid system 8 of FIG. 2.

In general, it may be desirable to maximize the efficiency, while simultaneously minimizing the size and weight of the optically rechargeable hearing aid 10. To help achieve these ends, it may be desirable to select the light source 32 and the photovoltaic cell 20 so that the light source 32's output spectrum matches the photovoltaic cell 20's photovoltaic conversion spectrum as closely as possible. This may help the photovoltaic cell 20 to achieve the highest possible efficiency in converting the light energy from the light source 32 into electrical energy.

For the purposes of the following discussion, it will be assumed that the hearing aid's rechargeable battery 24 may be any of the lithium based rechargeable batteries 160–160b (160, 160a and 160b) of FIGS. 10–19 that are disclosed herein. Such a lithium based rechargeable battery 160–160b may have a fully charged voltage in the range of from about 3.5 to about 4.5 volts. However, the voltage may vary, depending on the particular lithium based rechargeable battery 160–160b that is used.

Alternatively, any other type of rechargeable battery 24 besides a lithium based rechargeable battery 160–160b may be used, such as a NiCd rechargeable battery, or a NiMH rechargeable battery. However, since such alternative batteries have electrical properties that may differ from those of the lithium based rechargeable batteries 160–160b, the theoretical considerations for such alternative batteries may have to be adjusted for those differing electrical properties. Such adjustments may be apparent to those of ordinary skill in the art, in view of all of the disclosures herein.

Any suitable light source 32 may be used, such as a 660 nm (nanometer) GaAlAs (Gallium Aluminum Arsenide) double heterostructure LED (Light Emitting Diode) No. FH1011 made by the Stanley Corporation located Battle Creek, Mich., which may emit up to about 15 milliwatts of optical power.

Any suitable photovoltaic cell 20 may used, such as a Laser Power Converter for the 600–800 nm spectral region comprising a AlGaAs/GaAs (Aluminum Gallium Arsenide/ Gallium Arsenide) cell No. PPC-2S made by Photonic Power Systems located in Mountain View, Calif.

Alternatively, a suitable photovoltaic cell 20 may be a Laser Power Converter for the 1,000–1,550 nm spectral region comprising a InGaAs/InP (Indium Gallium Arsenide/ Indium Phosphide) cell made by the Spire Corporation of Bedford, Mass. If such a photovoltaic cell 20 is used, then a different LED 32 may be selected which has an output spectrum that peaks in the 1,000–1,550 nm spectral region, for maximum energy conversion efficiency.

Both such photovoltaic cells 20 may have a surface area of less than about 1 $mm^2$, and may be about 0.25 mm thick.

Figure 3:
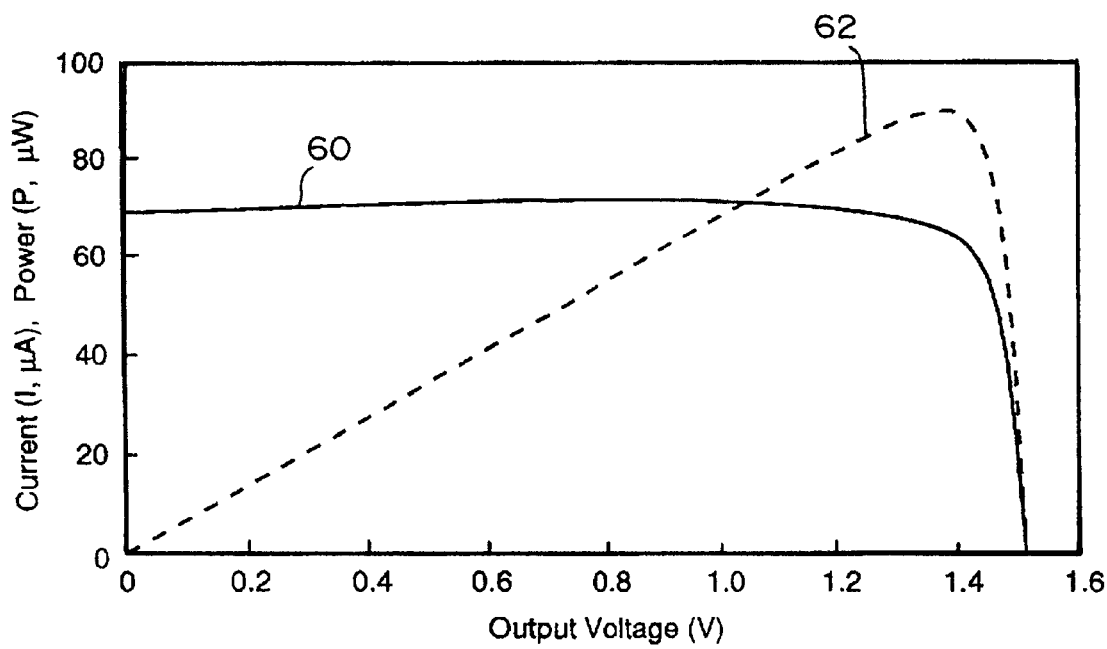
FIG. 3 is a graph illustrating the output of a photovoltaic cell that may be used in the optically rechargeable hearing aid of the present invention.

Referring now to FIG. 3, it illustrates the output of a comparatively low efficiency single AlGaAs/GaAs photovoltaic cell 20 having an area of about 1 $mm^2$, while the cell 20 is being illuminated by a single high intensity, 660 nm GaAlAs double heterostructure LED 32.

As seen in FIG. 3, the photovoltaic cell 20's I-V (current-voltage) curve 60 displays a nearly constant current output (I) at lower voltages in the range of about 0.0–1.4 V; with the current output (I) then dropping precipitously to zero over a narrow voltage range of from about 1.4–1.5 V. As is also seen in FIG. 3, the power (P) curve 62 generated by the photovoltaic cell 20 starts at 0 μW (microwatts) at 0 V, increases generally linearly to a peak power of about 90 μW at about 1.4 V, and then drops precipitously to zero over a narrow voltage range of from about 1.4–1.5 V.

It is conventional knowledge that photovoltaic cells 20 naturally produce this type of I-V curve 60 at high photon flux densities. It is also an entirely separate piece of conventional knowledge that the lithium based rechargeable batteries 160–160b may exhibit maximum recharge cycle life if they are first charged under constant current conditions at relatively low voltages, and are then charged at a constant voltage as their full charge voltage is approached. However, it is an important discovery on the part of the applicants that these two, entirely independent concepts may be successfully married, i.e., that the above photovoltaic cells 20 may be particularly well suited for recharging the lithium based rechargeable batteries 160–160b.

For the AlGaAs/GaAs photovoltaic cell 20 and the GaAlAs double heterostructure LED 32 described above, the light intensity at the surface of the cell 20 that is provided by the LED 32 is about 62 $kW/m^2$ (kilowatts per square meter), which corresponds to a light intensity of about 60 suns. One sun is equal to the intensity of the sunlight falling on the earth's equator at noon at sea level. In other words, the cell 20 is being operated in a "solar concentrator" mode under these conditions, in order to provide the high photon flux densities needed to achieve the relatively square I-V curve 60 illustrated in FIG. 3. When the cell 20 is operated at light intensities greater than about 5 suns, the output voltage of the cell 20 is higher and the cell 20 is less sensitive to its imperfections, than would be the case if the cell 20 were operated at light intensities less than about 5 suns.

For most photovoltaic cells 20, absent any series resistance within the cell 20, its I-V curve can be expected to be represented by:

$$I = I_s - I_0 \left[ \exp\left(-\frac{eV}{\alpha KT}\right) - 1 \right] \quad (1)$$

where $I_s$ is the short circuit current density (which is proportional to the photon flux impinging on the cell 20 from the LED 32); $I_0$ is the sum of the recombination currents in the cell 20; e is the charge on an electron; V is the cell 20's output voltage; K is Boltzmann's constant, and T is the temperature of the cell 20 in degrees Kelvin. In the above equation, $\alpha$ is a constant that is theoretically equal to 1.0 for a cell 20 that is dominated by diffusive recombination mechanisms; while $\alpha$ may theoretically have values of 2.0, or more, at low current levels in a cell 20 and/or when space charge or leakage currents are present in a cell 20.

The short circuit current density $I_s$ of the cell 20 is a slowly varying function of its band gap $E_g$. If the cell 20's open circuit voltage V is derived for the case when $\alpha=1.0$, it is found that:

$$eV_{oc} = KT \cdot \ln\left(1 + \frac{I_s}{I_0}\right) \cong E_g - KT \cdot \ln(bI_s) \quad (2)$$

where b is a function of the temperature and properties of the cell 20.

From the forgoing it can be seen that the open circuit voltage V of the cell 20 is proportional to its band gap $E_g$, but is only logarithmically dependent on its open circuit current density $I_s$.

Hence, it has been discovered that for an application where the cell 20 is being used to charge a rechargeable battery 24, the actual optical power falling on the cell 20 will have only a modest affect on the open circuit voltage V supplied by the cell 20 to the battery 24. This may be important because it may mean that the V supplied by the cell 20 to the battery 24 may be adjusted to match the cell 20's best constant-voltage recharge value (i.e., the cell 20's top-off voltage), relatively independently of the actual optical power falling on the cell 20. The V supplied by the cell 20 to the battery 24 may be adjusted in any suitable way, such as by varying the chemical composition of the cell 20 during its manufacture; thereby changing its band gap energy.

For the AlGaAs/GaAs photovoltaic cell 20 described above, which has a band gap $E_g$ of about 1.88 eV (electron volts), the open circuit voltage V is about 1.5 V. Thus, if a single such photovoltaic cell 20 is used to charge a typical lithium based rechargeable battery 160–160*b* having a fully charged voltage of about 3.5 volts, the battery management circuit 22 may comprise any suitable conventional voltage tripling circuitry, in order to help match the output of the cell 20 to the needs of the rechargeable battery 160–160*b*.

Alternatively, a series array of two, or more, such AlGaAs/GaAs photovoltaic cells 20 may be used. One limiting factor on the number of photovoltaic cells 20 in such an array is their cumulative total surface area, which may have to be held within strict limits because of the relatively small size of the hearing aid 10 in which they may be used. Depending on such factors as the particular number of photovoltaic cells 20 used in the array, the output voltage of each particular photovoltaic cell 20, and the fully charged voltage of the particular rechargeable battery 24 being charged, the battery management circuit 22 may comprise any suitable conventional voltage increasing, voltage decreasing, and/or battery overcharging prevention circuitry, as needed, to help match the voltage output of the particular array of photovoltaic cells 20 to the voltage needed for the particular rechargeable battery 24, and to help prevent overcharging of the rechargeable battery 24.

For example, a GaAs (gallium arsenide) photovoltaic cell 20 may be used that may have a series open circuit voltage V in the range of about 1.1–1.2 V, due to its junction design and composition. If three such GaAs photovoltaic cells 20 are used, then their series open circuit voltage V would be in the range of about 3.3–3.6 V. This would offer the dual advantages of: (a) being inherently quite compatible with recharging a lithium based rechargeable battery 160–160*b* having a fully charged voltage of about 3.5 V; and (b) minimizing, or even eliminating, the need for any battery management circuit 22 within the hearing aid 10, which may help achieve the important goal of minimizing the number, size and weight of the components located within the hearing aid 10.

If four such GaAs photovoltaic cells 20 are used, then their series open circuit voltage V would be in the range of about 4.4–4.8 V. If the four cells 20 were arranged in a square array, they would offer good utilization of the smallest possible area within the hearing aid 10. However, for a 3.5 V lithium based rechargeable battery 160–160*b*, such an array may provide significant over-voltage capability; and thus may require a battery management circuit 22 that may comprise any suitable conventional overcharge prevention circuitry to prevent such an array from overcharging a 3.5 V lithium based rechargeable battery 160–160*b*.

By way of example, it may be assumed that the lithium based rechargeable battery 160–160*b* may store about 10 mW-hr (milliwatt-hours) of energy, which is enough energy to power a typical ITC hearing aid 10 for about 18 hours. Assuming a typical conversion efficiency of about 40% for the AlGaAs/GaAs photovoltaic cell 20 described above, and a 6 hour charge time, this means that the GaAlAs LED light source 32 described above may have to provide only about 4.2 mW of optical output power over that period of time.

Figure 5:
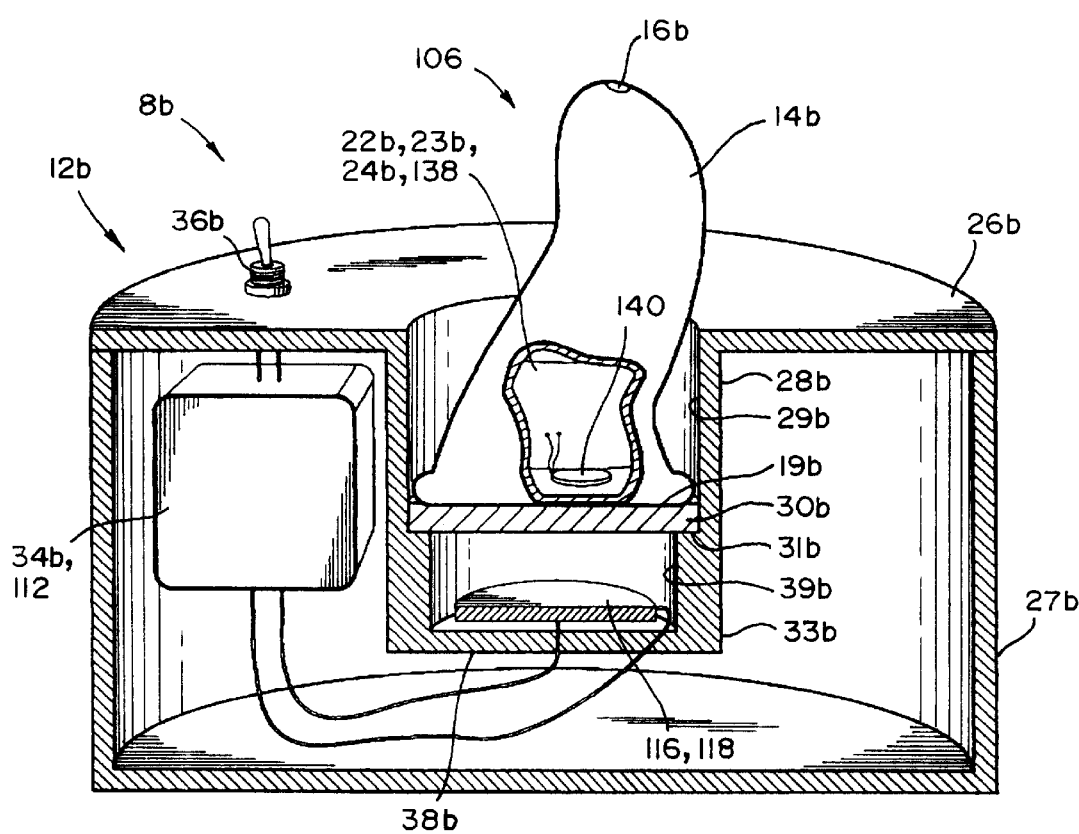
FIG. 5 is a perspective view, partially in cross-section and partially broken away, of the inductively rechargeable hearing aid system of the present invention.

INDUCTIVELY RECHARGEABLE HEARING AID SYSTEM:

Referring now to FIG. 5, an inductively rechargeable hearing aid system 8*b* is illustrated that may comprise an inductively rechargeable hearing aid 10*b* and an inductive charger 12*b* that may be the same as, or at least similar to, the optically rechargeable hearing aid 10 and the optical charger 12 of FIG. 1, respectively, with respect to their theory, construction and operation, except for those differences which will be made apparent by all of the disclosures herein.

Accordingly, for clarity and simplicity, certain parts of the inductively rechargeable hearing aid 10*b* and the inductive charger 12*b* of the embodiment of FIG. 5 have been given the same reference numerals, with an "b" appended, as the reference numerals used for the corresponding respective parts of the optically rechargeable hearing aid 10 and the optical charger 12 of FIG. 1.

Like the optically rechargeable hearing aid system 8 of FIG. 1, the inductively rechargeable hearing aid system 8*b* of FIG. 5 does not need any electrical contacts on the external surface of the hearing aid 10*b* in order to recharge the hearing aid 10*b*'s rechargeable battery 24*b*.

It should be noted that although the system 8*b* is illustrated and described herein with respect to inductively recharging an inductively rechargeable hearing aid 10*b*, the disclosures herein may be applied to optically recharging any battery powered device having a rechargeable battery, such as a pager or a cellular telephone.

Figure 6:
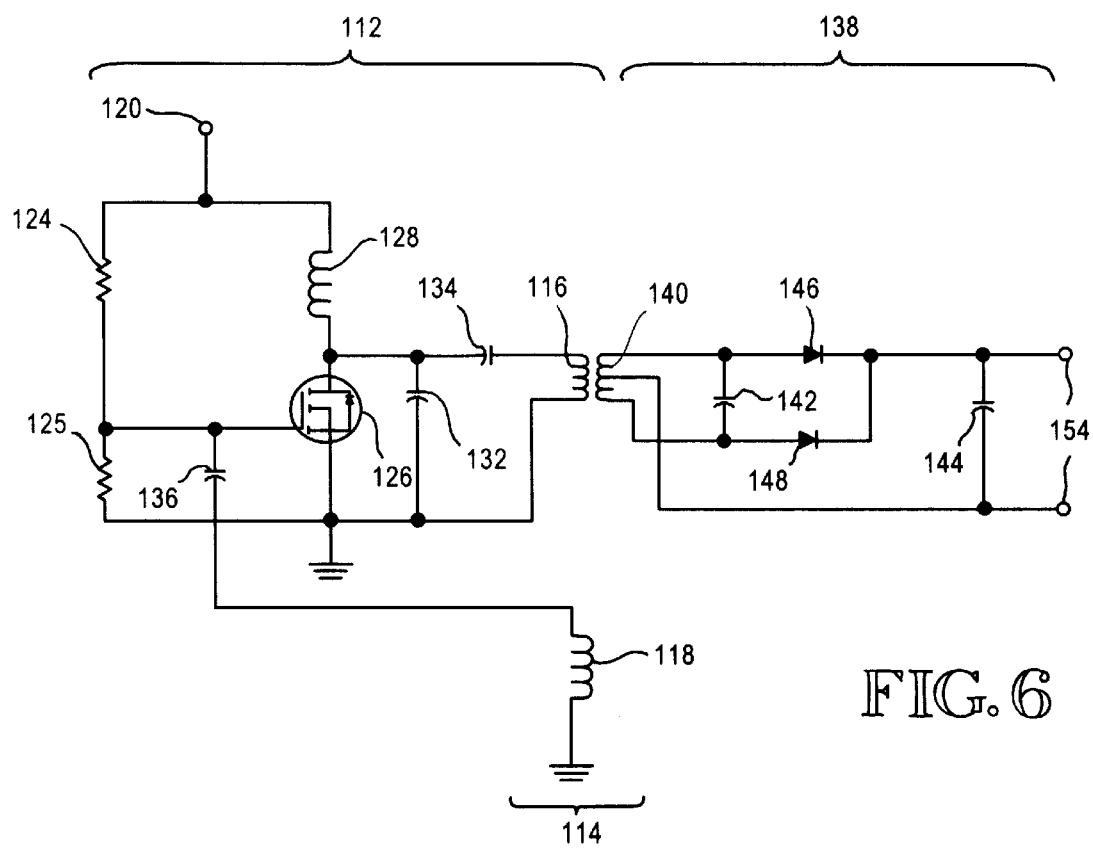
FIG. 6 is an electrical schematic for the inductive transmitting and receiving circuits thereof.

Turning now to FIG. 6, the inductive charger 12*b* may comprise a conventional inductive transmitting circuit 112; and the inductively rechargeable hearing aid 10*b* may comprise a conventional inductive receiving circuit 138.

The inductive transmitting circuit 112 may comprise a class E tuned power oscillator circuit designed to operate at any suitable frequency, such as a frequency in the range of about 7–10 MHz (megahertz), in which the series tuned output circuit is replaced by a stagger tuned inductive link comprising a 2.35 $\mu$H (microhenry) inductor 116 and a 0.08 $\mu$H inductor 118 that are inductively linked to a center-tapped 0.2 $\mu$H inductor 140 in the inductive receiving circuit 138. The inductive transmitting circuit 112 may further comprise a DC input terminal 120, that may receive a DC voltage of about +5 volts from any suitable power supply; a 16 kohm (kilo ohm) resistor 124; a 7.5 kohm resistor 125; a low "ON" resistance type Si9925 NMOSFET (N-channel metal oxide semiconductor field effect transistor) 126, made by Siliconix, Inc. of Santa Clara, Calif.; a 1,000 $\mu$H RF (radio frequency) choke 128; a 213 picofarad capacitor 132; a 217 picofarad capacitor 134; and a 100 nonofarad capacitor 136.

The inductively rechargeable hearing aid 10*b*'s inductive receiving circuit 138 may comprise the inductor 140; a 1,712 picofarad capacitor 142; a 0.05 microfarad capacitor 144; a pair of type HSMS-2820 Schottky diodes 146, 148 manufactured by the Hewlett Packard Company of Santa Clara, Calif.; and a pair of output terminals 154 across which a DC voltage in the range of about 3–8 volts may be provided.

During operation of the inductive transmitting circuit 112, the transistor 126 may act as a switch, transforming the DC power at the power supply voltage at the input terminal 120 into AC power at the circuit 112's resonant frequency, with oscillation produced through feedback via the inductor set 114, which comprises the inductors 116, 118, and 140. The resonant frequency of the circuit 112 is not fixed; and may be determined in part by the position of the primary coil set 116, 118 with respect to the secondary coil 140 of the inductive receiving circuit 138.

From the disclosures herein, any modifications of the circuit 112 needed to permit it to operate from any desired input voltage will now be apparent to those of ordinary skill in the art.

Turning again to FIG. 5, the inductive transmitting circuit 112 may be located in any convenient location within the inductive charger 12*b*. For example, the transmitting inductors 116, 118 may be located on the bottom wall 38*b* of the hearing aid holder 28*b*; while the rest of the inductive transmitting circuit 112 may be located in the same housing as the power supply 34*b*.

Similarly, the inductive receiving circuit 138 may be located in any convenient location with the inductively rechargeable hearing aid 10*b*. For example, the receiving inductor 140 may be located on the inside of the base 19*b* of the hearing aid 10*b*; while the rest of the inductive receiving circuit 138 may be part of the module comprising the battery management circuit 22, the voltage regulating circuit 23, and the rechargeable battery 24.

Preferably, the transmitting and receiving inductors 116, 118, 140 may be located as close to each other as may be reasonably possible, for better energy transfer from the transmitting inductor 116 to the receiving inductor 140. For example, the transmitting inductor 116 may be located on the bottom of the seat 30*b* for the rechargeable hearing aid 10*b*.

As an alternative to the inductively rechargeable hearing aid system 8*b* illustrated in FIGS. 5–6, the inductively rechargeable hearing aid system 8*b* may comprise any conventional inductive charger 12*b* that may be inductively coupled to an inductively rechargeable hearing aid 10*b* having a rechargeable battery 24*b*; wherein energy may be transferred from the charger 12*b* to the hearing aid 10*b* by the use of inductive transfer, rather than by the use of electrical contacts.

BATTERY MANAGEMENT CIRCUIT 22

In general, in order to obtain the longest life and the best performance from the rechargeable battery 24 used in rechargeable hearing aid 10, 10*a*, the battery management circuit 22 of the hearing aid 10, 10*a* may comprise any suitable conventional battery management circuit 22, and may: (a) properly charge the battery 24; (b) protect the battery 24 from overcharging; and/or (c) protect the battery 24 from overdischarging.

Regarding properly charging the battery 24, the battery management circuit 22 may comprise any suitable conventional voltage increasing or voltage decreasing circuitry, as needed, to help match the voltage output of the photovoltaic cell 20 of the optically rechargeable hearing aid 10 (or the voltage output of the inductive receiving circuit of an inductively rechargeable hearing aid 10*a*), to the charging voltage needed to recharge the rechargeable battery 24.

The battery management circuit 22 may also tailor the recharge conditions so that the battery 24 may be charged at a constant current until the design charging voltage for the battery 24 has been achieved. At that time, the battery management circuit 22 may maintain a constant voltage for trickle charging the battery 24.

Regarding discharge of the battery 24, the battery management circuit 22 may be designed so that when the discharge voltage of the battery 24 drops to a predetermined minimum cutoff voltage, the battery management circuit 22 may: (a) sound an audible or visual alarm to alert the user to the almost-discharged state of the battery 24; and/or (b) effectively shut down the rechargeable hearing aid 10, 10*a* by reducing the power supplied by the battery 24 to a predetermined minimum, maintenance or "sleep" level. The current provided by the battery 24 under such "sleep" conditions may be as low as about 1–5 $\mu$A, thereby permitting the battery 24 to be safely discharged down to a minimum battery voltage (of about 2.5 V, if it is a typical lithium based rechargeable battery 160–160*b*), without damage to the battery 24.

The rechargeable battery 24 may be designed so that only about 50% of its capacity may be used during a normal daily cycle in the hearing aid 10, 10*a* before the battery 24 is normally recharged; in order to help avoid overdischarging the battery 24, and to help extend the cycle life of the battery 24.

DC TO DC VOLTAGE REGULATING CIRCUIT 23: IN GENERAL

Figure 7:
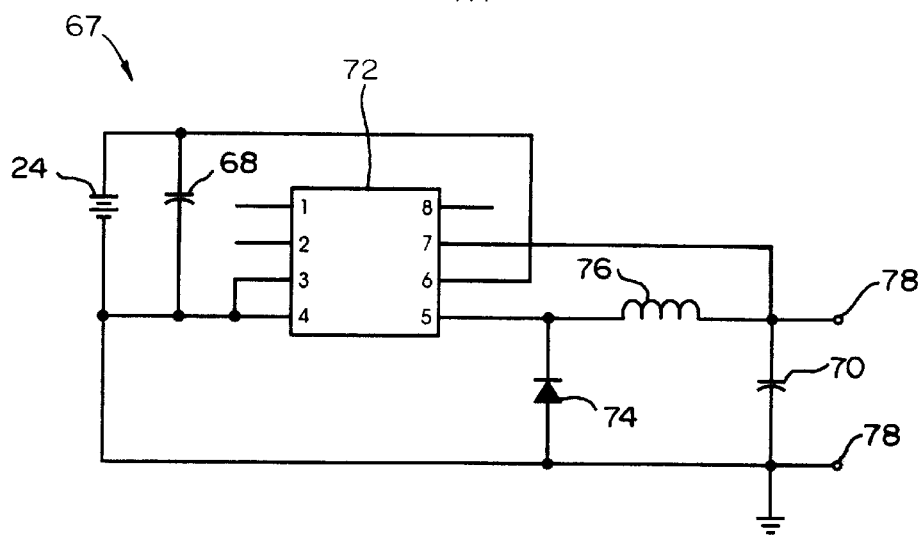
FIG. 7 is an electrical schematic of a first embodiment of a DC to DC voltage regulating circuit, one utilizing inductive energy transfer, that may be used in the rechargeable hearing aids of the present invention.
Figure 9:
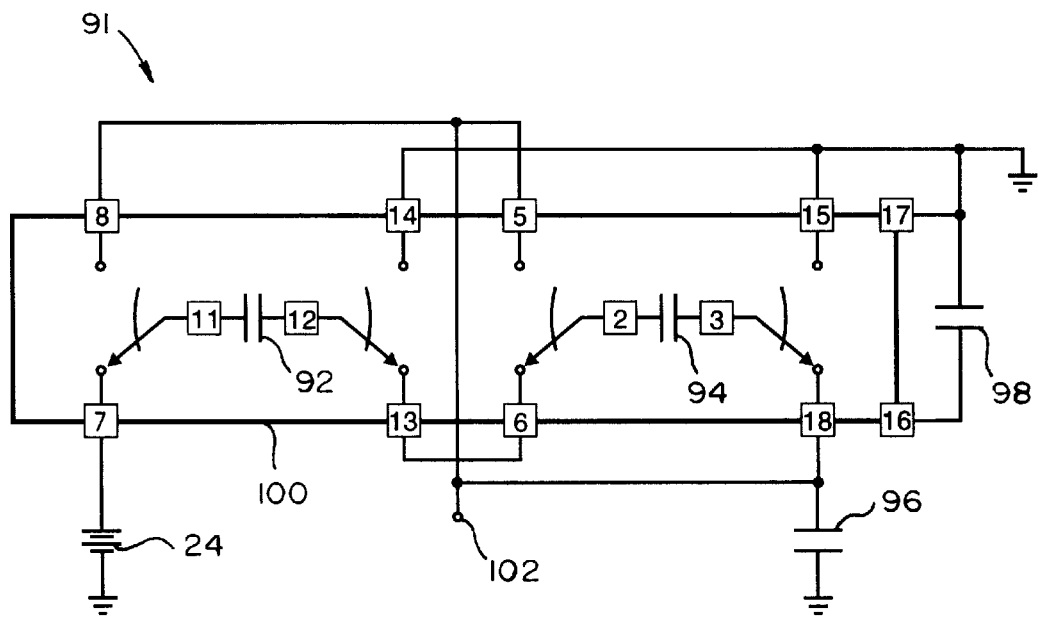
FIG. 9 is an electrical schematic of a second embodiment of a DC to DC voltage regulating circuit, one utilizing capacitive energy transfer, that may be used in the rechargeable hearing aids of the present invention.

In general, the DC to DC voltage regulating circuit 23 may comprise any suitable conventional voltage regulating circuit 23, such as the regulating circuit 67 of FIG. 7 or the regulating circuit 91 of FIG. 9, which may be designed to be used with any high energy rechargeable battery 24 that may have a relatively high output DC voltage that may decline with time as the battery 24 is discharged. For example, for a single such battery 24 the output voltage may decline from about 4 V down to about 2.5 V as it is discharged. Such high energy rechargeable batteries 24 may comprise any of the lithium based rechargeable batteries 160–160b that are disclosed below.

The regulating circuit 23 may be designed to provide a relatively constant output DC voltage at any desired level, despite the declining voltage output it receives from the high energy rechargeable battery 24 over time. The output DC voltage provided by the regulating circuit 23 may be selected to match that needed by the conventional audio amplifier and related circuitry in the particular hearing aid 10, 10a with which the regulating circuit 23 may be used. For example, the output DC voltage from the regulating circuit 23 may be selected to be anywhere in the range of from about 0.8–3.0 V. The conventional audio amplifier and related circuitry in the hearing aids 10, 10a may operate at about 1.2 volts, for example.

It may be preferred that the voltage regulating circuit 23 be highly efficient, so that as little energy as possible is lost during the DC to DC voltage conversion by the regulating circuit 23.

Figure 4:
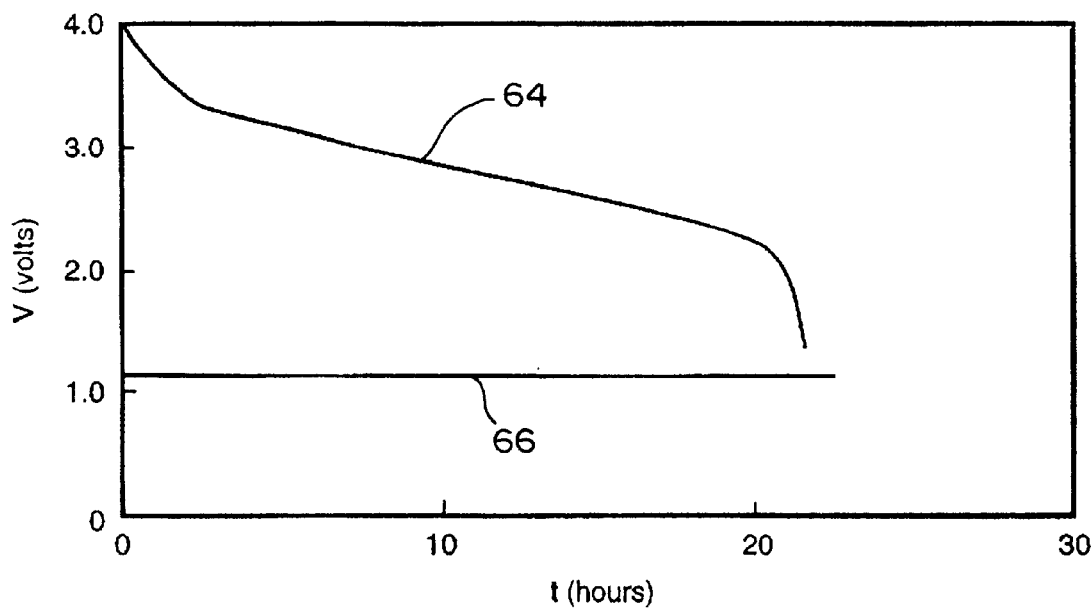
FIG. 4 is a graph illustrating the output of a high energy rechargeable lithium-ion battery that may be used in the rechargeable hearing aids of the present invention.

Turning now to FIG. 4, its graphed line 64 illustrates the declining voltage output over time from a high energy, lithium based rechargeable battery 160–160b. The graphed line 66 illustrates the relatively constant output voltage (in this case about 1.2 V) from the voltage regulating circuit 23.

In the example illustrated in FIG. 4, if the desired constant current from the voltage regulating circuit 23 was about 900 $\mu$A, in order to produce a constant 1,080 $\mu$W of output power; then the current drain from the lithium based rechargeable battery 160–160b may range from about 270 $\mu$A at 4.0 V up to about 432 $\mu$A @ 2.5 V, in order to provide that desired constant 1,080 $\mu$W of output power, neglecting losses.

The peak current demand of the conventional audio amplifier and related circuitry of the hearing aids 10, 10a may be about 1 to 10 mA, for example. However, the impedance of a high energy, rechargeable battery 24 may be in the range of from about 5 to 20 ohms, and thus a battery 24 with this level of impedance may have some difficulty in providing all of the current that the audio amplifier and related circuitry need to produce high fidelity in loud environments.

Accordingly, the voltage regulating circuit 23 may also be designed so that the impedance it presents to the conventional audio amplifier and related circuitry of the hearing aids 10, 10a is significantly lower than that of the high energy, rechargeable battery 24, thereby decreasing the effective impedance of the rechargeable battery.

The effective impedance of the voltage regulating circuit 23 may be as low as about 0.02 ohms, thereby resulting in a very nice impedance ratio between the regulating circuit 23 and the conventional audio amplifier and related circuitry in the hearing aids 10, 10a.

It may also be important to note that the current capacity of the battery 24 also increases. For example, a 6 mA-hr lithium based rechargeable battery 160–160b with a nominal output voltage over life of 3.2 V has a capacity of about 12 mA-hr if the output voltage of the rechargeable battery 160–160b is converted by the voltage regulating circuit 23 to 1.2 V at 75% efficiency.

DC TO DC VOLTAGE REGULATING CIRCUIT 67: SWITCHING REGULATOR UTILIZING INDUCTIVE ENERGY TRANSFER

One embodiment of the DC to DC voltage regulating circuit 23 is shown as the regulating circuit 67 in the electrical schematic of FIG. 7. The regulating circuit 67 illustrates a switching regulator approach using inductive energy transfer, with a regulated output voltage of 1.31 V across its output terminals 78.

In FIG. 7, the battery 24 may be a lithium based rechargeable battery 160–160b having an output voltage in the range of about 3.6–4.0 V when fully charged; the capacitors 68 and 70 may be 1 $\mu$F and 10 $\mu$F capacitors, respectively; the integrated circuit 72 may be a MAX638 integrated circuit switching regulator having the pin numbers indicated, manufactured by Maximum Integrated Products Inc., located in Sunnyvale, Calif.; the diode 74 may be a diode No. SGL41-20, made by General Instrument Corporation, located in Melville, N.Y.; and the inductor 76 may be a 680 $\mu$H inductor, part No. 262LY-681K, made by Toko America Inc., located in Mount Prospect, Ill.

Figure 8:
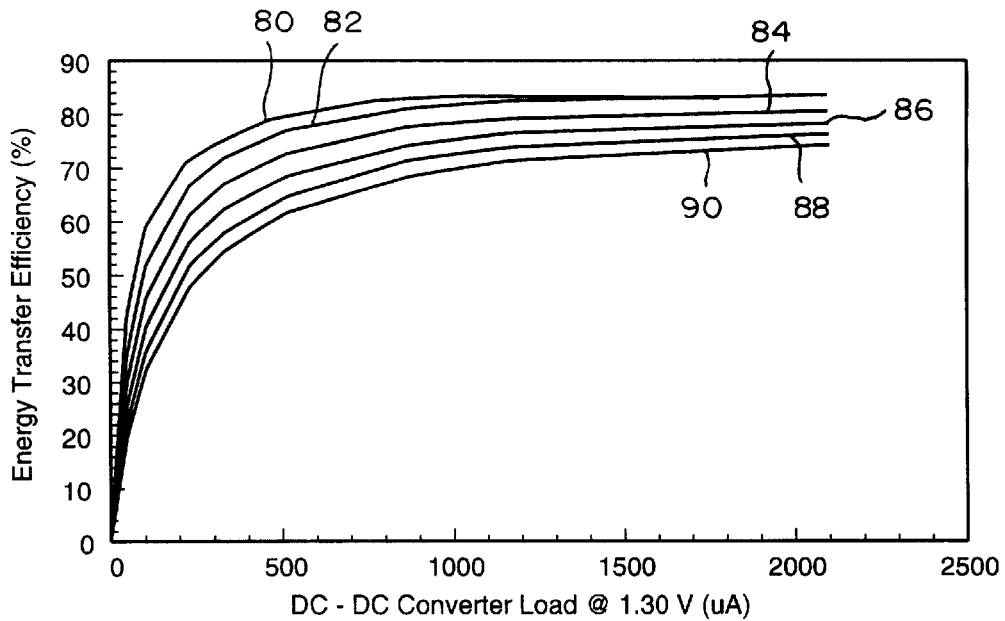
FIG. 8 is a graph illustrating certain characteristics of the FIG. 7 electrical circuit during operation.

Referring now to FIG. 8, it illustrates the efficiencies obtained by the voltage regulating circuit 67 illustrated in FIG. 7 for various input voltages from the battery 24, for various output loads across the output terminals 78. It also illustrates the effect of operating at different points on the battery discharge curve and with different output conditions on the integrated circuit 72. In FIG. 8, the curves 80, 82, 84, 86, 88, and 90 are for output voltages from the battery 24 of 2.0 V, 2.4 V, 2.8 V, 3.2 V, 3.6 V and 4.0 V, respectively. Naturally, the output voltages from the battery 24 are the input voltages for the regulating circuit 67.

As seen in FIG. 8, the efficiencies of the regulating circuit 67 were very poor at low current drains; but increased to a very favorable 70% to 80% at higher output currents from the regulating circuit 67. At a constant output current there was a moderate reduction in efficiency as the input voltage to the regulating circuit 67 increased. This may be caused by larger peak surge currents within the integrated circuit 72 and gradual increases in the fixed losses of the various components of the regulating circuit 67.

It was observed that with an input voltage of 2.0 volts to the regulating circuit 67, the integrated circuit 72's base current drain was 39 $\mu$A; while at 4.0 V it had increased to 61 $\mu$A. A regulating circuit 67 having an efficiency that increases with an increased load is always desirable when operating from a portable power source since that minimizes wasted energy when demand is highest.

DC TO DC VOLTAGE REGULATING CIRCUIT 91: SWITCHED CAPACITOR VOLTAGE "THIRDER" UTILIZING CAPACITIVE ENERGY TRANSFER

Another embodiment of the DC to DC voltage regulating circuit 23 is shown as the regulating circuit 91 in the electrical schematic of FIG. 9; and illustrates a switched capacitor voltage "thirder" using capacitive energy transfer and FET (field effect transistor) switches to divide the input voltage from the rechargeable battery 24 by 3.

In general, the capacitive energy transfer of the FIG. 9 regulating circuit 91 may have the advantage, compared to the inductive energy transfer of the FIG. 7 regulating circuit 67, of employing no inductors or other magnetic media that might otherwise interfere with using RF (radio frequency) induction based recharging of the battery 24 or which might produce low-impedance noise on the output terminals 78 of the regulating circuit 67.

In FIG. 9, the battery 24 may be a lithium based rechargeable battery 160–160b having an output voltage in the range of about 3.6–4.0 V when fully charged; the capacitors 92, 94, 96 may be 1.0 $\mu$F capacitors; the capacitor 98 my be a 0.01 $\mu$F capacitor; and the integrated circuit 100 may be a LCT1043 switched capacitor instrumentation building block having the pin numbers indicated, manufactured by Linear Technology Corp., located in Milpitas, Calif. This particular integrated circuit 100 contains FET transistor switches and circuits which may be used to divide an input voltage by 3. Thus, for a battery 24 having a fully charged voltage of 3.6 V, the regulated output voltage of the regulating circuit 91 at the output terminal 102 may be 1.2 V.

The "thirder" regulating circuit 91 offers an important advantage in the context of regulating the DC output voltage of a battery 24 whose output voltage declines over time as it is discharged. This advantage is that the DC output voltage of the "thirder" regulating circuit 91 will decrease with time at only $\frac{1}{3}$ the rate at which the output voltage of the battery 24 decreases with time.

LITHIUM BASED RECHARGEABLE BATTERY 160 HAVING A CATHODE 162 AND AN ANODE 164 THAT ARE FOLDED ALTERNATELY OVER EACH OTHER

One of the reasons why lithium based rechargeable batteries have not been accepted in the hearing aid consumer market place may be due to the fact they may have to use non-aqueous based electrolytes because of the high reactivity of the lithium used in the battery. This appears to present a major problem, since a lithium based rechargeable battery with a non-aqueous electrolyte may be expected to have an internal resistance (or output impedance) that may be as much as about 1,000 times higher than that of a comparable aqueous electrolyte battery, such as a zinc air primary battery or a NiCd rechargeable battery, in small button cell designs. Thus, the internal resistance (or output impedance) of a lithium based rechargeable battery may be expected to be as high as about 1,000 ohms, which may severely restrict their use in hearing aids, where an impedance as low as about 4 ohms may generally be desired.

Figure 10:
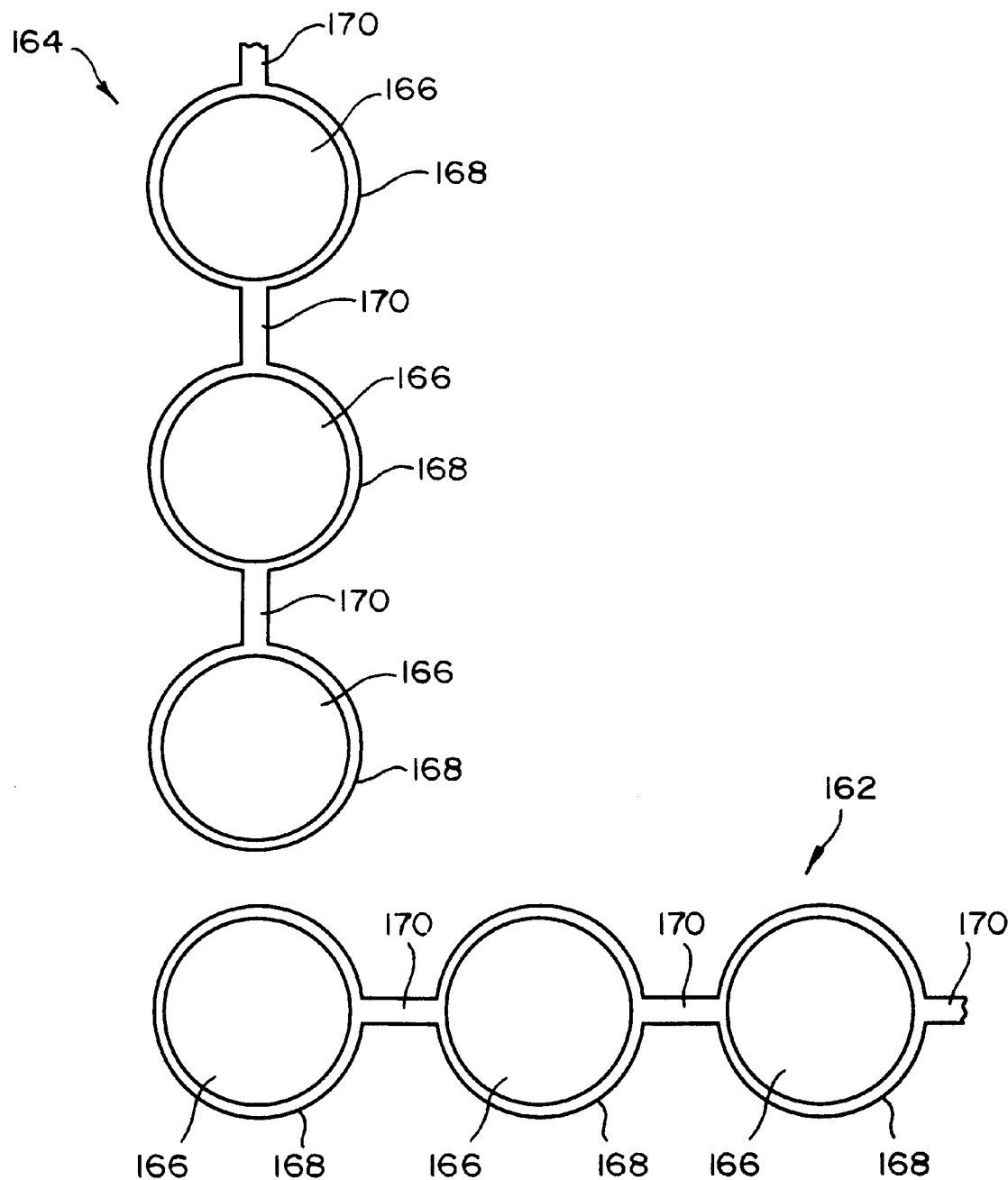
FIG. 10 is a top elevational view, partially broken away, of a cathode and an anode that may be used to form an alternately folded cell stack that may be utilized in the rechargeable batteries for the rechargeable hearing aids of the present invention.
Figure 11:
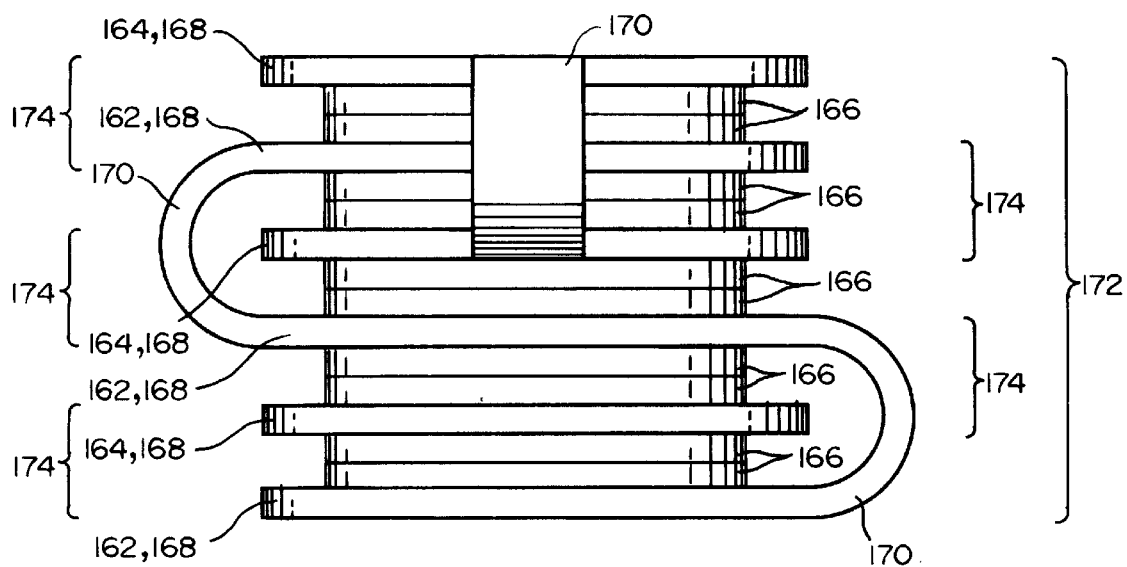
FIG. 11 is a side elevational view, partially broken away, of an alternately folded cell stack that may be formed using the cathode and anode of FIG. 10.
Figure 12:
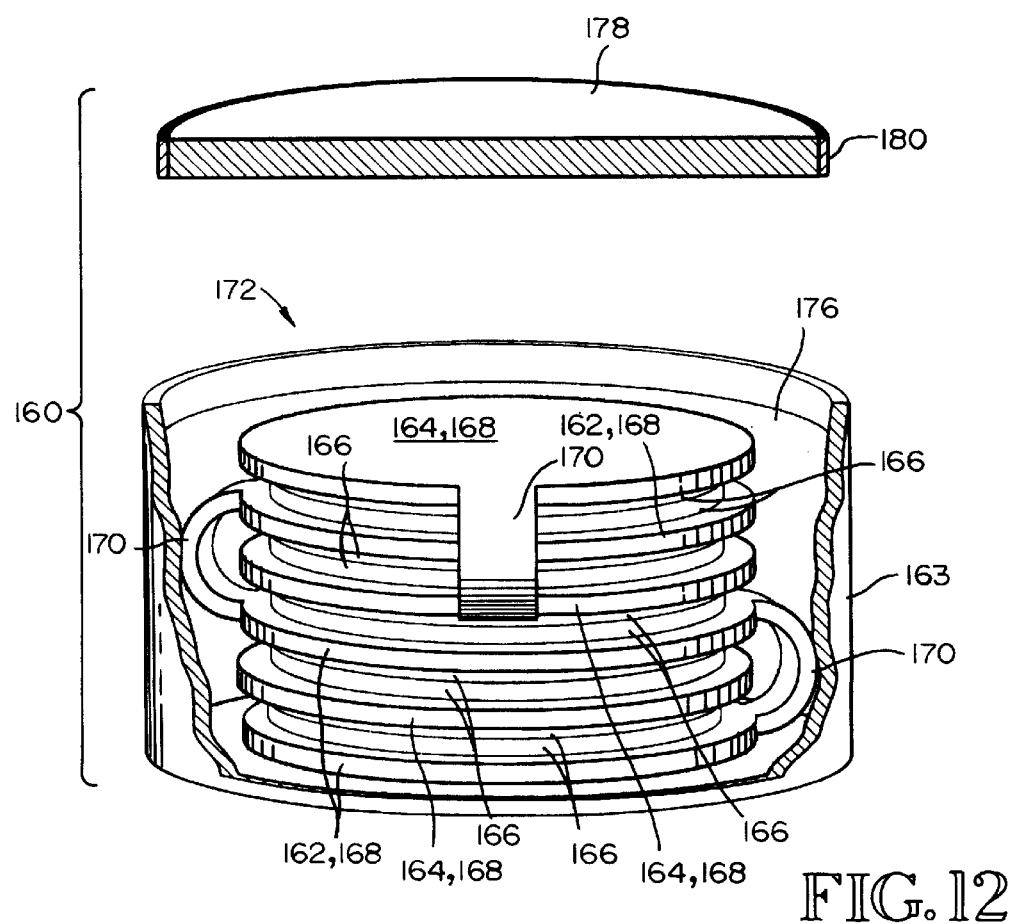
FIG. 12 is an exploded perspective view, partially broken away, showing the alternately folded cell stack of FIG. 11 as part of a rechargeable button cell battery.

However, it has been discovered that the lithium based rechargeable battery 160 of FIGS. 10–12 has overcome the above major problem. This is because it has been discovered that if the battery 160's elements (its cathode 162, anode 164 and layers of electrolyte 166) are selected, shaped and folded in certain ways, as will be described below in detail, then the needed large surface areas for the battery 160's elements can be obtained, in order to provide the needed, relatively low internal resistance (or output impedance) for the battery 160; and yet the battery 160's large surface area elements will still fit within the external size, shape and volume of any conventional sized button cell battery.

All of the above comments regarding the battery 160 may apply equally well to the batteries 160a and 160b (of FIGS. 13–19) described below, which may also need to have large surface areas for their respective battery elements, in order to provide the needed, relatively low internal resistance (or output impedance) for the batteries 160a and 160b; and yet have the large surface area elements of the batteries 160a and 160b still fit within the external size, shape and volume of any conventional sized button cell battery.

Referring now to FIGS. 10–12, the hearing aid 10's battery 24 may comprise the lithium based rechargeable battery 160 having a cathode 162 and an anode 164 that are folded alternately over each other. The battery 160 may comprise a conductive can 163; a conductive cover 178 having a peripheral insulating gasket 180; and an alternately folded battery cell stack 172 comprising a cathode 162, an anode 164 and several layers of electrolyte 166. The battery 160 may further comprise any suitable non-conductive encapsulant material 176, such as silicone rubber, for encapsulating the alternately folded cell stack 172 within the can 163.

The cathode 162, the anode 164 and/or each layer of electrolyte 166 may each have a thickness in the range of from about 1 or 2 microns to about 0.4 mm, depending on the specifications of the particular battery 160 in which they are to be used.

The cathode 162 may comprise at least two circular elements 168, with each pair of its adjacent circular elements 168 being connected to each other by a neck 170. Similarly, the anode 164 may also comprise at least two circular elements 168, with each pair of its adjacent circular elements 168 being connected to each other by a neck 170. The cathode 162 and the anode 164 may be formed in any suitable way, such as by being punched from a respective strip of material; or by being molded from a respective material.

A layer of electrolyte 166 may be located on the top and/or bottom surfaces of one, or more, of the circular elements 168 of the cathode 162 and/or the anode 164. Each layer of electrolyte 166 may comprise all of the material placed between the adjacent elements 168 of the cathode 162 and the anode 164, and may serve the functions of: (a) physically separating the adjacent elements 168 of the cathode 162 and the anode 164, to prevent them from shorting out with each other; and/or (b) allowing the transport of ions between the adjacent elements 168 of the cathode 162 and the anode 164.

Each layer of electrolyte 166 may be deposited on its respective surface of its respective circular element 168 in any suitable way, such as by the use of conventional solvent coating, dip coating, vapor deposition or sputtering techniques. Alternatively, each layer of electrolyte 166 may comprise a porous separator or a membrane that has been stamped from a strip of suitable material, or molded from a suitable material, and then assembled in the desired location on its respective surface of its respective circular element 168 in any suitable way. The porous separator or membrane may be impregnated with one or more suitable electrolytic materials.

Although the layers of electrolyte 166 are illustrated as being smaller than the circular elements 168, they may be the same size, or larger than, the circular elements 168.

Referring now to FIG. 10, in order to form the alternately folded cell stack 172, the cathode 162 and the anode 164 may first be oriented at any suitable angle with respect to each other, with one end of the anode 164 overlapping a respective end of the cathode 162. Then, as seen in FIG. 11, by alternately folding the cathode 162 and the anode 164 back and forth over each other, the alternately folded cell stack 172 of unit battery cells 174 may be completed. Each unit cell 174 may comprise one circular element 168 from the cathode 162, one circular element 168 from the anode 164, and their separating layer(s) of electrolyte 166. Although the unit battery cells 174 are illustrated as each having two layers of electrolyte 166, at least one of the unit battery cells 174 may have only one layer of electrolyte 166.

The circular elements 168 of the cathode 162 may be effectively connected in parallel with each other by their respective necks 170. Similarly, the circular elements 168 of the anode 164 may be effectively connected in parallel with each other by their respective necks 170. As seen in FIGS. 11 and 12, the bottom circular element 168 of the cathode 162 may not have a bottom layer of electrolyte 166, so that there may be direct electrical contact between the cathode 162 and the can 163 when alternately folded cell stack 172 and the can 163 are assembled together. Similarly, the top circular element 168 of the anode 164 may not have a top layer of electrolyte 166, so that there may be direct electrical contact between the anode 164 and the cover 178 when the alternately folded cell stack 172, the can 163 and the cover 178 are assembled together.

After the alternately folded cell stack 172 has been formed, the battery 160 may be completed by first inserting the cell stack 172 into a conventional cylindrical button battery can 163. The encapsulant material 176 may then be applied around the alternately folded cell stack 172, so that the encapsulant material 176 may hold the alternately folded cell stack 172 centered in the can 163, and may insulate the anode 164 from inadvertent electrical contact with the can 163. The battery 160 may then be completed by sealing the can 163 with the cover 178 and insulating gasket 180.

When the battery 160 is assembled, the cathode 162 may be in direct electrical contact with the can 163 as described above, or it may be electrically connected thereto in any suitable way, such as by using a metal tab or wire. Similarly, the anode 164 may be in direct electrical contact with the cover 178 as described above, or it may be electrically connected thereto in any suitable way, such as by using a metal tab or wire. Alternatively, the anode 164 may be in direct electrical contact with the can 163, or it may be electrically connected thereto in any suitable way, such as by using a metal tab or wire; and the cathode 162 may be in direct electrical contact with the cover 178, or it may be electrically connected thereto in any suitable way, such as by using a metal tab or wire.

Although only one cathode 162 and one anode 164 are illustrated (with their associated layers of electrolyte 166), there may be more than one cathode 162 and more than one anode 164 (with their associated layers of electrolyte 166).

The maximum number of unit cells 174 that may be formed for a battery 160 having any given external height may depend on such factors as the thickness of the elements 168 that form the cathode 162 and the anode 164, and the thickness of each layer of electrolyte 166.

Disposable hearing aid batteries are typically in the shape of cylindrical "button cell" batteries. Such disposable button cell hearing aid batteries may range in size and volume from a Model 5 button cell battery, having an external diameter of 5.7 mm, an external height of 2 mm, and an exterior volume of about 50 mm$^3$; to a Model 675 button cell battery having an external diameter of 11.6 mm, an external height of 5.3 mm, and an exterior volume of about 560 mm$^3$.

The rechargeable battery 160 may be designed to have an external size, shape and volume that matches any button cell battery within the above range. Alternatively, the rechargeable battery 160 may be made in any other external size, shape and volume, within reason. For example, the battery 160 may be designed to have any other desired cross-sectional shape besides circular, in which case the circular elements 168 of the cathode 162 and the anode 164 may be selected to have a shape corresponding to the particular cross-sectional shape of the particular battery 160 under consideration. In addition, if the battery 160 was designed to have a cross-sectional shape that was square or rectangular, the necks 170 in the cathode 162 and the anode 164 may be eliminated, and the separate elements 168 may not need to be formed. Instead, the alternately folded cell stack 172 for such a battery 160 may be formed by simply using a rectangular cathode 162 and a rectangular anode 164 that are folded with respect to each other in any of the manners described above; with each folded area having a size selected to correspond to, and fit within, the size of the square or rectangular cross-sectional shape of the battery 160.

The battery 160 may be designed so that its various electrical properties, such as its output voltage, internal resistance (or output impedance), and energy storage capacity, may have any desired values, within reason. Such desired values for the battery 160 may be obtained by suitably varying one or more of the pertinent factors, such as: (a) the number of cathode(s) 162, anode(s) 164 and layer(s) of electrolyte 166 that comprise the battery 160; (b) when there are at least 2 cathodes 162 and at least two anodes 164, (with their associated layers of electrolyte 166), whether the multiple cathodes 162 are electrically connected in parallel or in series with each other, and whether the multiple anodes 164 are electrically connected in parallel or in series with each other; (c) the shape, area and/or thickness of each of the battery 160's cathode(s) 162, anode(s) 164 and layer(s) of electrolyte 166; (d) the materials from which each of the battery 160's cathode(s) 162, anode(s) 164 and layer(s) of electrolyte 166 are made; and/or (e) the manner in which the cathode(s) 162, anode(s) 164 and layer(s) of electrolyte 166 are folded with respect to each other.

It may be important to note that, in general, all of the lithium based rechargeable batteries 160–160b that are disclosed herein may have output voltages that are in the range of from about 3.0–4.5 V when fully charged, and that are in the range of from about 1.2–3 V when nearly fully discharged. These are much higher output voltages than the output voltages of conventional rechargeable batteries that may be used in hearing aids, such as rechargeable NiCd batteries, which may have output voltages that are in the range of from about 1.2–1.5 V when fully charged, and in the range of from about 0.5–0.9 V when nearly fully discharged.

Such high output voltages of the lithium based rechargeable batteries 160–160b of the present invention may be very important since it means these batteries may be used to power even the newer, better integrated circuits that may require a drive voltage in the range of from about 3–5 V. Such newer, better integrated circuits may not have been used in conventional commercially available rechargeable hearing aids, possibly because conventional rechargeable batteries may not supply sufficient output voltages, and because of the energy losses that would occur if voltage increasing circuits were used with such conventional rechargeable batteries.

As an alternative, the rechargeable battery 160 of FIGS. 10–12 may be a NiMH rechargeable battery. In general, the materials used for the cathode(s), anode(s) and/or layer(s) of electrolyte in any conventional NiMH rechargeable battery may be used, respectively, for the cathode(s) 162, anode(s) 164 and/or layer(s) of electrolyte 166 in such a NiMH rechargeable battery 160 of the present invention.

EXAMPLE LITHIUM RECHARGEABLE BATTERY 160 HAVING A SOLID ELECTROLYTE COMPRISING A POLYMER OR GEL

The lithium based rechargeable battery 160 of FIGS. 10–12 may comprise a lithium rechargeable battery 160. In general, the materials used for the cathode(s), anode(s) and/or layer(s) of electrolyte in any conventional lithium rechargeable battery may be used, respectively, for the cathode(s) 162, anode(s) 164 and/or layer(s) of electrolyte 166 in the lithium rechargeable battery 160 of the present invention.

By way of example, let it be assumed that such a rechargeable battery 160 is to be designed to have an external size, shape and volume that are equal to those of the Model 675 disposable cylindrical button cell battery described above. Let it be further assumed that the rechargeable battery 160 has a cathode 162 that comprises $V_2O_5$ (which may be deposited on any suitable conductive current collector); an anode that comprises lithium metal (which may be deposited on any suitable conductive current collector); and at least one layer of solid electrolyte 166 that comprises a polymeric lithium-ion conducting material such as LiCF$_3$SO$_3$ in PEO (polyethylene oxide).

Alternatively, the at least one layer of solid electrolyte 166 may comprise any other suitable salt, such as LiPF$_6$, in any other suitable polymer. Alternatively, the at least one layer of solid electrolyte 166 may comprise a gel, such as LiClO$_4$ or LiPF$_6$ in EC-PC (ethylene carbonate-propylene carbonate) gelled into PAN (polyacrylonitrile).

In addition, let it also be assumed that the rechargeable battery 160 is to have an internal resistance (or an output impedance) in the range of about 1–10 ohms, an energy storage capacity of about 6 mAh; and an output voltage that ranges from about 4.0 V when fully charged, down to about 1.5 V when nearly fully discharged, with an assumed loading of the cathode 162 and the anode 164 in the range of about 0.2–2.0 mAh/cm$^2$.

It should be noted that if such a battery 160 were made with one circular cathode 162 about 0.3 mm thick, one circular anode 164 about 0.120 mm thick, and one layer of a resistive solid electrolyte 166 about 0.010 mm thick between them; and if such a cathode 162, anode 164 and layer of electrolyte 166 each had a diameter of about 11.0 mm, and area of about 1.0 cm$^2$, so that they would fit inside the can of a Model 675 button cell battery, such a battery 160 would have an internal resistance (or an output impedance) on the order of about 400 ohms. Since the conventional audio amplifier and related circuitry in the hearing aids 10, 10a may draw a transient current of up to about 75 ma, such a high battery impedance may be undesirable because the output voltage of the battery 160 would drop due to its internal resistance losses at high current pulses.

However, if the areas of the battery 160's elements (i.e., its cathode 162, anode 164, and at least one layer of electrolyte 166), were each suitably increased to about 15.0 cm$^2$, and if the thicknesses of its elements (assuming current collectors having a thickness of 0.025 mm) were reduced to 0.045 mm, 0.033 mm, and 0.001 mm, respectively, then the internal resistance (or output impedance) of the battery 160 may drop to about 1 ohm at 36° C., thereby making the battery 160 suitable for use in the rechargeable hearing aids 10, 10a. In general, such a low internal resistance for the battery 160 may be highly desirable, since the lower the IR (current times resistance) power losses in the battery 160, the better the battery 160 will perform.

In order to fit within the internal volume of a Model 675 button cell battery, and in order to simultaneously have the above specifications and desired large surface area of about 15 cm$^2$, the cathode 162 and the anode 164 shown in FIG. 10 for the battery 160 may each be punched out of respective strips of material about 180 mm long and 11 mm wide, to form 15 circular elements 168 joined by necks 170. The strip of material (including the current collector) for the cathode 162 may be about 0.045 mm thick; the strip of material for the anode (including the current collector) may be about 0.033 mm thick; and each layer of electrolyte 166 be about 0.001 mm thick.

The circular elements 168 and their associated layers of electrolyte 166 may each be about 11.0 mm in diameter, and the necks 170 may each be about 0.4 mm wide and about 0.15 mm long. There may be only one layer of electrolyte 166 between adjacent elements 168, even though, as an alternative, FIGS. 11–12 illustrate double layers of electrolyte 166 between adjacent elements 168.

As a result, the total areas of the cathode 162 and the anode 164 (not counting the area of the necks 170), may each be the desired 15 cm$^2$. When the cathode 162 and the anode 164 are folded to form the alternately folded cell stack 172 that was described above, the circular elements 168 of the cathode 162 and the anode 164 may be separated by layers of electrolyte 166 that also have a total area of about 15 cm$^2$.

For the example battery 160 specified above, there would be 15 unit cells 174; and the cell stack 172 would have an overall height of about 1.2 mm, and an overall width, including the folded necks 170, of about 11.5 mm.

EXAMPLE LITHIUM-ION RECHARGEABLE BATTERY 160 HAVING A LIQUID ELECTROLYTE, OR HAVING A SOLID ELECTROLYTE COMPRISING A POLYMER OR GEL

The lithium based rechargeable battery 160 of FIGS. 10–12 may comprise a lithium-ion rechargeable battery 160. In general, the materials used for the cathode(s), anode(s) and layer(s) of electrolyte in any conventional lithium-ion rechargeable battery may be used, respectively, for the cathode(s) 162, anode(s) 164 and layer(s) of electrolyte 166 in the lithium-ion rechargeable battery 160 of the present invention.

The capacity loadings on both the cathode 162 and the anode 164 of the lithium-ion rechargeable battery 160 may be selected to be matched, and they may be in the range of about 1–10 mAh/cm$^2$.

The cathode 162 of the lithium-ion rechargeable battery 160 may comprise a layer of material coated on any suitable metallic foil, such as aluminum foil or stainless steel foil. The metallic foil may have a thickness in the range of about 25–125 μm, and the cathode 162 may have an overall thickness in the range of about 0.1–0.4 mm. The metallic foil may serve both as a substrate for carrying the layer of material, and as a current collector for the cathode 162. The layer of material used in the cathode 162 may be selected from the group comprising lithiated nickel oxide, lithiated cobalt oxide or lithiated manganese oxide. Alternatively, the layer of material used in the cathode 162 may comprise any suitable lithiated vanadium oxides, such as V$_2$O$_5$ lithiated to Li$_x$V$_2$O$_5$; or any other suitable Li$^+$ intercalation compound, such as TiS$_2$ lithiated to LiTiS$_2$. The layer of material may be coated on the cathode 162's metallic foil in any suitable way, such as by spraying, doctor blading or dip coating.

The anode 164 of the lithium-ion rechargeable battery 160 may comprise a layer of material coated on any suitable metallic foil, such as copper foil, stainless steel foil or nickel foil. The metallic foil may have a thickness in the range of about 25–125 μm, and the anode 164 may have an overall thickness in the range of about 0.1–0.4 mm. The metallic foil may serve both as a substrate for carrying the layer of material and as a current collector for the anode 164. The layer of material used in the anode 164 may comprise any one of several forms of carbon that have been known to intercalate lithium during cathodic reduction to form a lithium intercalation compound that may be described as C$_6$Li$_x$, where (0<x≦1). Examples of such forms of carbon may be graphite, amorphous carbon and coke. The layer of material may be coated on the anode 164b's metallic foil in any suitable way, such as by spraying, doctor blading or dip coating.

Each layer of electrolyte 166 in the lithium-ion rechargeable battery 160 may comprise a sheet of porous material impregnated with the desired electrolytic chemicals. The sheet of porous material may have a thickness in the range of about 25–125 μm, and may serve to separate the cathode 162 from the anode 164, besides holding the electrolytic chemicals. The sheet of porous material may be Celgard 2400, which is a polypropylene microporous film made by Hoechst-Celanese of Charlotte, N.C. The electrolytic chemicals used to impregnate the sheet of porous material may be a 1 M solution of lithium hexafluoarsenate (LiAsF$_6$) in a 50/50 V/V (volume for volume) mixture of propylene carbonate (PC) and dimethylether (DME).

Alternatively, instead of each layer of electrolyte 166 in the lithium-ion rechargeable battery 160 comprising a sheet of porous material impregnated with a liquid electrolyte, each layer of electrolyte 166 may be a solid electrolyte comprising a layer of polymer electrolyte 166 (such as LiCF$_3$SO$_3$ or LiPF$_6$ in PEO), or a layer of gel electrolyte 166 (such as LiClO$_4$ or LiPF$_6$ in EC-PC gelled into PAN.

By way of example, let it be assumed that the lithium-ion rechargeable battery 160 of FIGS. 10–12 has a cathode 162 comprising a layer of lithiated cobalt oxide coated on a strip of aluminum foil; an anode 164 comprising a layer of graphitic carbon coated on a strip of copper foil; and layers of electrolyte 166, each comprising a strip of Celgard 2400 impregnated with a 1 M solution of lithium hexafluoarsenate (LiAsF$_6$) in a 50/50 V/V mixture of propylene carbonate (PC) and dimethylether (DME). Such a battery 160 may have the following electrochemical designation:

(Al)-LiCoO$_2$/1M LiAsF$_6$-PC,DME/C-(Cu)  (3)

Lithium ions may be initially moved from the cathode 162 to the anode 164 by charging the battery 160. The electrochemical process involved may be:

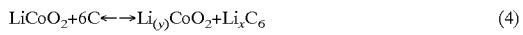

LiCoO$_2$+6C⇌Li$_{(y)}$CoO$_2$+Li$_x$C$_6$  (4)

The following example of a lithium-ion rechargeable battery 160 of FIGS. 10–12 having a liquid electrolyte 166 is one that has been built and tested.

The battery 160 was cylindrical, had a diameter of about 8 mm, a height of about 3.6 mm and a volume of about 0.18 cc; which is approximately the size, shape and volume of a conventional model 312 hearing aid button cell battery.

The cathode 162 weighed about 104 mg; had an overall thickness of about 0.19 mm; and comprised six circular elements 168, with its adjacent circular elements 168 being joined by necks 170. The cathode 162 comprised an aluminum foil current collector about 0.001 inches thick and a coating of lithiated cobalt oxide on both sides of five of its circular elements 168; with one of its end circular elements 168 being coated on only one side, so that its aluminum foil current collector could make direct electrical contact with the battery 160's can 163.

The anode 164 weighed about 50 mg; had an overall thickness of about 0.15 mm; and also comprised six circular elements 168, with its adjacent circular elements 168 being joined by necks 170. The anode 164 comprised a copper foil current collector about 0.001 inches thick and a carbon coating on both sides of five of its circular elements 168; with one of its end circular elements 168 being coated on only one side. A copper tab extended from this last disk so that the tab could make direct electrical contact with the battery 160's cover 178.

The layers of electrolyte 166 were formed by wrapping the anode 164 with two layers of Celgard 2400 (each layer being 25 microns thick), which were then heat sealed. The copper tab extended beyond the layers of Celgard so that the tab could make direct electrical contact with the battery 160's cover 178.

The alternately folded cell stack 172 was then formed; placed in the can 163; impregnated with electrolytic chemicals comprising a 1 M solution of lithium hexafluoarsenate (LiAsF$_6$) in a 50/50 V/V (volume for volume) mixture of propylene carbonate (PC) and dimethylether (DME); and sealed with the cover 178 in the manner which has already been described above regarding the batteries 160 of FIGS. 10–12. The resulting battery 160 had a mass of about 470 mg.

The battery 160 was charged and discharged at a current of 0.75 mA through several charge/discharge cycles to condition it; and was then discharged from a fully charged voltage of 4.1 V. The voltage on discharge was fairly flat, averaging 3.6 V over the range of about 3.8 V down to about 3.5 V. The capacity of the battery 160 was about 9.5 mAh, and it cycled with no significant capacity decay for several cycles. The battery 160 had an energy density of about 75 Wh/kg or 200 Wh/l. The battery 160 had surprisingly good pulse current capability. A current pulse of about 800 mA was observed as a short circuit current.

Six more test batteries 160 were constructed as described above. They all had capacities of from about 8.5 mAh to about 10.5 mAh, and cycled with coulombic efficiencies of greater than 99.2%.

By way of comparison, a model 312 NiMH rechargeable battery has a capacity of about 12 mAh and a voltage of about 1.2 V; and a model 312 zinc-air battery (which is not rechargeable), has a capacity of about 130 mAh and a voltage of about 1.2 V.

Thus, the test batteries 160 were superior to a comparable NiMH rechargeable battery because they contained nearly three times as much energy, and may be able to withstand as many as 1,000 to 1,500 charge/discharge cycles.

The test batteries 160 were also superior to comparable non-rechargeable zinc-air batteries because over their anticipated lifetimes the test batteries 160 may deliver about 200 times as much energy as one non-rechargeable zinc-air battery. Thus, over a period of five years a hearing aid may use only one of the test batteries 160 instead of needing at least about 150 non-rechargeable zinc-air batteries.

LITHIUM BASED RECHARGEABLE BATTERY 160a HAVING A CATHODE 162a AND AN ANODE 164a THAT ARE SPIRAL WRAPPED AROUND EACH OTHER

Figure 13:
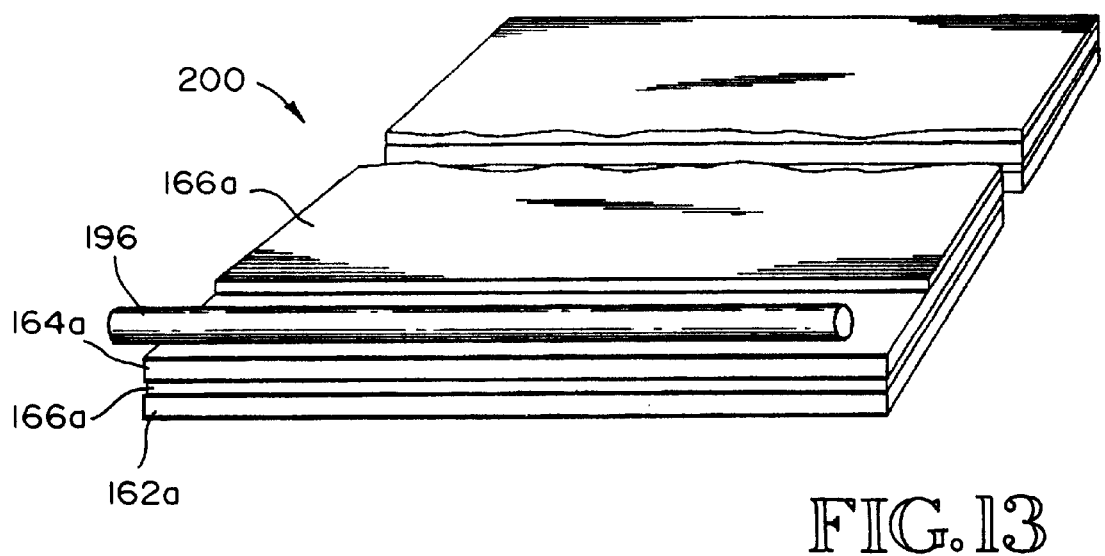
FIG. 13 is a perspective view, partially broken away, of a cell sandwich and an anode rod that may be used to form a spiral wrapped cell stack that may be utilized in the rechargeable batteries for the rechargeable hearing aids of the present invention.
Figure 14:
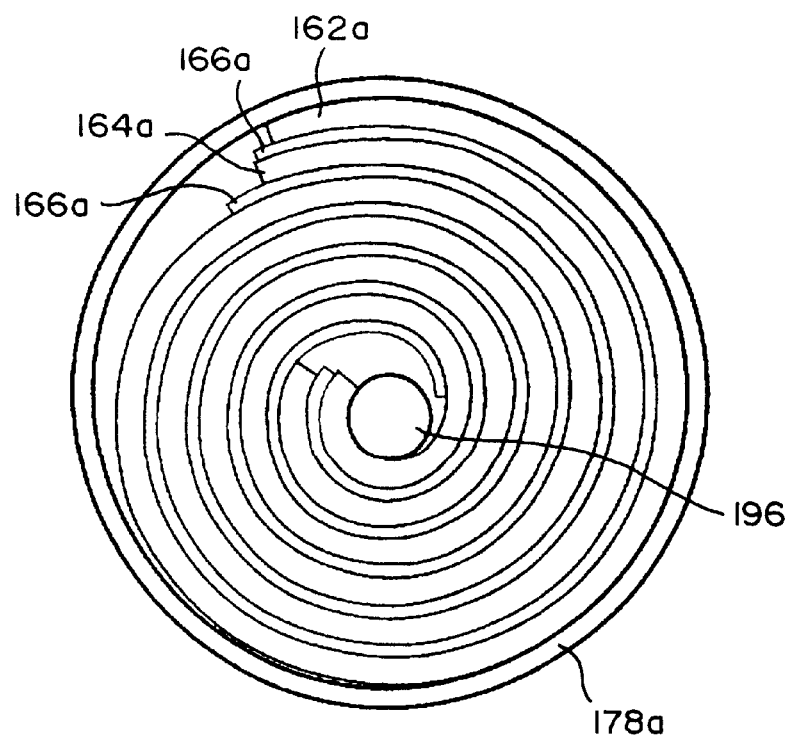
FIG. 14 is an end elevational view, taken along line 14—14 of FIG. 15, of the can of a rechargeable button cell battery containing a spiral wrapped cell stack that may be formed using the cell sandwich and anode rod of FIG. 13.
Figure 15:
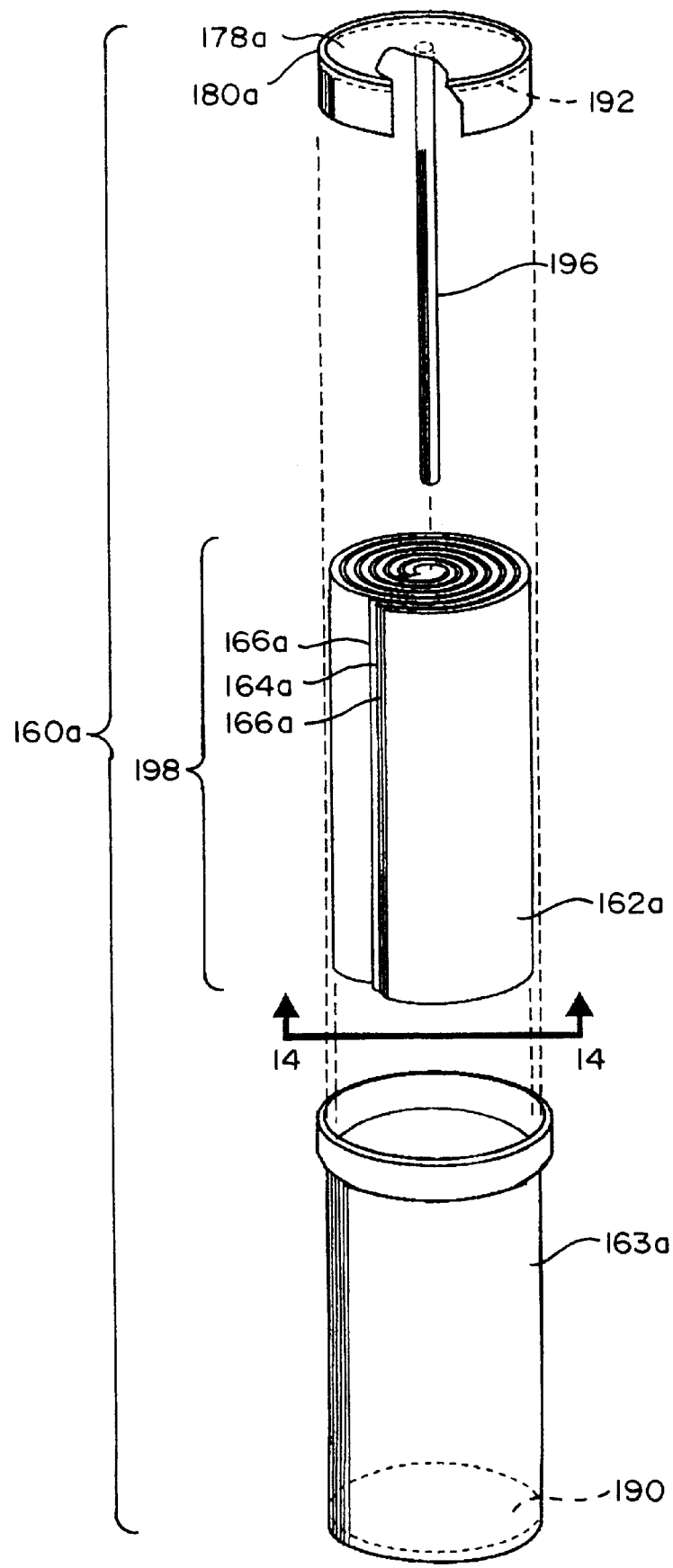
FIG. 15 is an exploded perspective view, partially broken away, showing the spiral wrapped cell stack of FIG. 14 as part of a rechargeable button cell battery.
Figure 16:
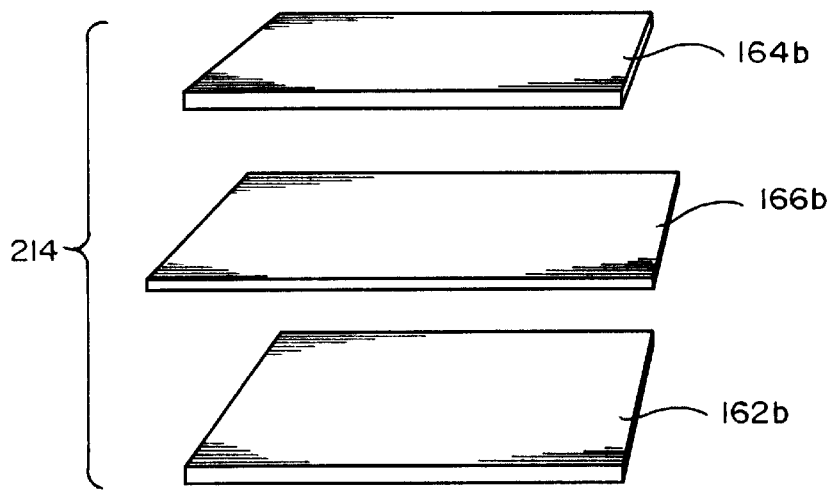
FIG. 16 is an exploded perspective view of a cell sandwich that may be used to form an accordion folded cell stack that may be utilized in the rechargeable batteries for the rechargeable hearing aids of the present invention.

Turning now to FIGS. 13–15, the battery 24 may comprise a lithium based rechargeable battery 160a having a cathode 162a and an anode 164a that are spiral wrapped around each other. The battery 160a illustrated in FIGS. 13–15 may be the same as, or similar to, the rechargeable battery 160 of FIGS. 10–12 with respect to its theory, construction and operation, except for those differences which will be made apparent by the disclosures herein. Accordingly, for clarity and simplicity, certain parts of the rechargeable battery 160a of FIGS. 13–15 have been given the same reference numerals, with an "a" appended, as the reference numerals used for the corresponding respective parts of the rechargeable battery 160 of FIGS. 10–12.

The battery 160a may comprise a conductive can 163a; an insulating gasket 190 inside the bottom of the can 163a; a conductive cover 178a having a peripheral insulating gasket 180a; an insulating gasket 192 inside the top of the cover 178a; a spiral wrapped battery cell stack 198 that may be formed from a cell sandwich 200 comprising a cathode 162a, an anode 164a, and at least two layers of electrolyte 166a; and a conductive anode rod 196 in electrical contact with the anode 164a. The anode rod 196 may be made from type SS 304 stainless steel. Alternatively, the anode rod 196 may be made from any other suitable material, such as copper, hastelloy or carbon composite.

The anode rod 196 may be in direct electrical contact with the anode 164a, as seen in FIG. 13, or it may be electrically connected thereto in any suitable way, such as by using a wire.

When the battery 160a is assembled, the anode 164a may be in direct electrical contact with the cover 178a, or it may be electrically connected thereto in any suitable way, such as by using the anode rod 196 or by using a wire. Similarly, the cathode 162a may be in direct electrical contact with the can 163a, or it may be electrically connected thereto in any suitable way, such as by using a wire. Such direct electrical contact between at least part of the outer wrap of the cathode 162a and the can 163a may be enhanced by sizing the spiral wrapped cell stack 198 such that the outer wrap of the cathode 162a may make a snug fit with the inside of the can 163a. Alternatively, the anode 164a may be in direct electrical contact with the can 163a, or it may be electrically connected thereto in any suitable way, such as by using the anode rod 196 or by using a wire; and the cathode 162a may be in direct electrical contact with the cover 178a, or it may be electrically connected thereto in any suitable way, such as by using a wire.

The insulating gasket 190 inside the bottom of the can 163a may serve the function of helping to prevent the cathode 162a and the anode 164a from shorting out with each other, either directly, or through contact with the can 163a. Similarly, the insulating gasket 192 inside the top of the cover 178a may serve the function of helping to prevent the cathode 162a and the anode 164a from shorting out with each other, either directly, or through contact with the cover 178a.

As seen in FIG. 15, the anode rod 196 may be formed as part of the cover 178a. Alternatively, the anode rod 196 may be formed as a separate element that may then be secured in a conductive relationship to the cover 178a in any suitable way, such as by welding or by the use of any suitable electrically conductive adhesive.

In general, at least one of the layers of electrolyte 166a may have at least the same length as the cathode 162a and the anode 164a, to help prevent the ends of the cathode 162a and the anode 164a from shorting out with each other, either directly, or through contact with the can 163a or the cover 178a. Alternatively, any particular layer of electrolyte 166a may be longer than, or shorter than, the cathode 162a and the anode 164a. However, if a particular layer of electrolyte 166a is shorter than the cathode 162a and the anode 164a, then any suitable insulating material may be provided to prevent the ends of the cathode 162a and the anode 164a from shorting out with each other.

In general, at least one of the layers of electrolyte 166a may have at least the same width as the cathode 162a and the anode 164a, to help prevent the sides of the cathode 162a and the anode 164a from shorting out with each other, either directly, or through contact with the can 163a or the cover 178a. Alternatively, any particular layer of the electrolyte 166a may be narrower than, or wider than, the cathode 162a and the anode 164a. However, if a particular layer of electrolyte 166a is narrower than the cathode 162a and the anode 164a, then any suitable insulating material may be provided to prevent the sides of the cathode 162a and the anode 164a from shorting out with each other.

If at least one of the layers of electrolyte 166a extends past the bottom sides of the cathode 162a and the anode 164a, then the insulating gasket 190 inside of the bottom of the can 163a may be eliminated, since that at least one layer of electrolyte 166a may serve the function of the insulating gasket 190.

Similarly, if at least one of the layers of electrolyte 166a extends past the top sides of the cathode 162a and the anode 164a, then the insulating gasket 192 inside the top of the cover 178a may be eliminated, since that at least one layer of electrolyte 166a may serve the function of the insulating gasket 192.

As best seen in FIGS. 13–14, the two layers of electrolyte 166a may be located on the faces of the anode 164a. Alternatively, the two layers of electrolyte 166a may be located on the faces of the cathode 162a. Alternatively, three layers of electrolyte 166a may be provided, so that all of the faces of the cathode 162a and the anode 164a may be covered with a layer of electrolyte 166a. In any event, the locations of the layers of electrolyte 166a may be selected so as to ensure that there is at least one layer of electrolyte 166a located between the adjacent faces of the cathode 162a and the anode 164a when the cathode 162a and the anode 164a are rolled up on top of each other to form the spiral wrapped cell stack 198, in order to help prevent the cathode 162a and the anode 164a from shorting out with each other.

In order to form the spiral wrapped cell stack 198, the cover 178a may be placed in the micro-chuck of a winding machine, and then rotated. Since the anode rod 196 may be secured to both the cover 178a and the anode 164a, when the cover 178a is rotated the cell sandwich 200 (comprising the cathode 162a, the anode 164a and the layers of electrolyte 166a), will be wound automatically in a spiral around the anode rod 196. After the spiral wrapped cell stack 198 has been formed, the battery 160a may then be completed by first inserting the cell stack 198 into the can 163a, and by then sealing the can 163a with the cover 178a and the insulating gasket 180a.

The rechargeable battery 160a of FIGS. 13–15 may be designed to have an external size, shape and volume that matches any conventional button cell battery. Alternatively, the rechargeable battery 160a may be made in any other external size, shape and volume, within reason. For example, the battery 160a may be made in any particular desired prismatic shape. This may be done by first using any suitable means, such as a die, to form the cylindrical spiral wrapped cell stack 198 into the desired prismatic shape; and by then inserting the prismatically formed cell stack 198 into a can 163a and a cover 178a having the desired prismatic shape.

The rechargeable battery 160a of FIGS. 13–15 may be designed so that its various electrical properties, such as its output voltage, internal resistance (or output impedance), and energy storage capacity, may have any desired values, within reason. Such desired values for the battery 160a may be obtained by suitably varying one or more of the pertinent factors, such as: (a) the number of cathode(s) 162a, anode(s) 164a and layers of electrolyte 166a that comprise the battery 160a; (b) when there are at least 2 cathodes 162a and at least two anodes 164a, (with their associated layers of electrolyte 166a), whether the multiple cathodes 162a are electrically connected in parallel and or in series with each other, and whether the multiple anodes 164a are electrically connected in parallel or in series with each other; (c) the shape, area and/or thickness of each of the battery 160a's cathode(s) 162a, anode(s) 164a and layers of electrolyte 166a; (d) the materials from which each of the battery 160a's cathode(s) 162a, anode(s) 164a and layers of electrolyte 166a are made; and/or (e) the manner in which the cathode(s) 162a, anode(s) 164a and layers of electrolyte 166a are wound to form the spiral wrapped cell stack 198.

The battery 160a of FIGS. 13–15 may have a cathode 162a, an anode 164a, and layers of electrolyte 166a may be made, respectively, from any of the materials that were set forth above regarding the cathode 162, the anode 164 and the layers of electrolyte 166 for the battery 160 of FIGS. 10–12.

The battery 160a of FIGS. 13–15 may have a cathode 162a, an anode 164a, and layers of electrolyte 166a whose thicknesses, respectively, may be the same as the thicknesses set forth above regarding the cathode 162, the anode 164 and the layers of electrolyte 166 for the battery 160 of FIGS. 10–12.

As an alternative, the rechargeable battery 160a of FIGS. 13–15 may be a NiMH rechargeable battery. In general, the materials used for the cathode(s), anode(s) and/or layer(s) of electrolyte in any conventional NiMH rechargeable battery may be used, respectively, for the cathode(s) 162a, anode(s) 164a and/or layer(s) of electrolyte 166a in such a NiMH rechargeable battery 160a of the present invention.

EXAMPLE LITHIUM BASED RECHARGEABLE BATTERY 160a HAVING A CATHODE 162a AND AN ANODE 164a THAT ARE SPIRAL WRAPPED AROUND EACH OTHER

By way of example, let it be assumed that a rechargeable battery 160a of FIGS. 13–15 is to be designed that has an external size, shape and volume that match those of the conventional Model 675 disposable cylindrical button cell battery that was described above regarding the lithium based rechargeable battery 160 of FIGS. 10–12.

Let it be further assumed that the rechargeable battery 160a of FIGS. 13–15 has a cathode 162a, an anode 164a and two layers of electrolyte 166a that comprise the same materials used for the corresponding elements in the example battery 160 described above regarding FIGS. 10–12, namely a cathode 162a that comprises $V_2O_5$; an anode 164 that comprises lithium metal; and at least two layers of electrolyte 166a that each comprise a polymeric lithium-ion conducting material such as $LiCF_3SO_3$ in PEO (polyethylene oxide). The anode rod 196 may be made from SS 304.

In addition, let it also be assumed that the rechargeable battery 160a of FIGS. 13–15 is to have the same electrical characteristics as the battery 160 of FIGS. 10–12, namely an internal resistance (or an output impedance) in the range of about 1–10 ohms, an energy storage capacity of about 6 mAh; and an output voltage that ranges from about 4.0 V when fully charged, down to about 1.5 V when nearly fully discharged, with an assumed loading of the cathode 162 and the anode 164 in the range of about 0.2–2.0 $mAh/mm^2$.

In order for the battery 160a of FIGS. 13–15 to fit within the external volume of a conventional standard Model 675 button cell battery, and in order to simultaneously have the specifications and the desired large surface area of about 15 $cm^2$ that was described above for the battery 160 of FIGS. 10–12, then the cathode 162a, the anode 164a, and the two layers of electrolyte 166a of the battery 160a may each be formed from respective strips of material about 30 cm long and about 5.0 mm wide. The strip of material for the cathode 162a may be about 0.200 mm thick; the strip of material for the anode 164a may be about 0.075 mm thick; and each layer of electrolyte 166 may be about 0.025 mm thick.

The anode rod 196 may be about 5.0 mm long and about 1.5 mm thick. The can gasket 190 and the cover gasket 192 may each have a diameter of about 11.1 mm, a thickness of about 0.05 mm, and be made from polypropylene.

LITHIUM BASED RECHARGEABLE BATTERY 160b HAVING A CATHODE 162b AND AN ANODE 164b THAT ARE ACCORDION FOLDED WITH RESPECT TO EACH OTHER

Turning now to FIGS. 16–19, the battery 24 may comprise a lithium based rechargeable battery 160b having a cathode 162b and an anode 164b that are accordion folded with respect to each other. The battery 160b illustrated in FIGS. 16–19 may be the same as, or similar to, the rechargeable battery 160 of FIGS. 10–12 with respect to its theory, construction and operation, except for those differences which will be made apparent by the disclosures herein. Accordingly, for clarity and simplicity, certain parts of the rechargeable battery 160b of FIGS. 16–19 have been given the same reference numerals, with a "b" appended, as the reference numerals used for the corresponding respective parts of the rechargeable battery 160 of FIGS. 10–12.

Referring now to FIGS. 16–19, the battery 160b may comprise a can 163b; a cover 178b; a gasket 180b around the outside of the cover 178b; and an accordion folded cell stack 216 that may be formed from a cell sandwich 214 that may comprise a cathode 162b, an anode 164b, and a layer of electrolyte 166b. The battery 160b may further comprise any suitable non-conductive encapsulant material, such as silicone rubber, for encapsulating the accordion folded cell stack 216 within the can 163b.

The layer of electrolyte 166b may have at least the same length as the cathode 162b and the anode 164b, to help prevent the ends of the cathode 162b and the anode 164b from shorting out with each other, either directly, or through contact with the can 163b or the cover 178b. Alternatively, the layer of electrolyte 166b may be longer than, or shorter than, the cathode 162b and the anode 164b. However, if the layer of electrolyte 166b is shorter than the cathode 162b and the anode 164b, then any suitable insulating material may be provided to prevent the ends of the cathode 162b and the anode 164b from shorting out with each other.

In general, the layer of electrolyte 166b may have at least the same width as the cathode 162b and the anode 164b, to help prevent the sides of the cathode 162b and the anode 164b from shorting out with each other, either directly, or through contact with the can 163b or the cover 178b. Alternatively, the layer of electrolyte 166b may be narrower than, or wider than, the cathode 162b and the anode 164b. However, if a particular layer of electrolyte 166b is narrower than the cathode 162b and the anode 164b, then any suitable insulating material may be provided to prevent the sides of the cathode 162b and the anode 164b from shorting out with each other.

When the battery 160b is assembled, the cathode 162b may be in direct electrical contact with the can 163b, or it may be electrically connected to the can 163b in any suitable way, such as by using a wire; and the anode 164b may be in direct electrical contact with the cover 178b, or it may be electrically connected to the cover 178b in any suitable way, such as by using a wire. Alternatively, the cathode 162b may be in direct electrical contact with the cover 178b, or it may be electrically connected to the cover 178b in any suitable way, such as by using a wire; and the anode 164b may be in direct electrical contact with the can 163b, or it may be electrically connected to the can 163b in any suitable way, such as by using a wire.

In order to form the accordion folded cell stack 216, the cell sandwich 214 may first be formed by centering the cathode 162b and the anode 164b with respect to the layer of electrolyte 166b. As a result of such centering, in the cell sandwich 214 the sides of the layer of electrolyte 166b may extend past the respective sides of the cathode 162b and the anode 164b, as seen in FIGS. 16–19.

Figure 20:
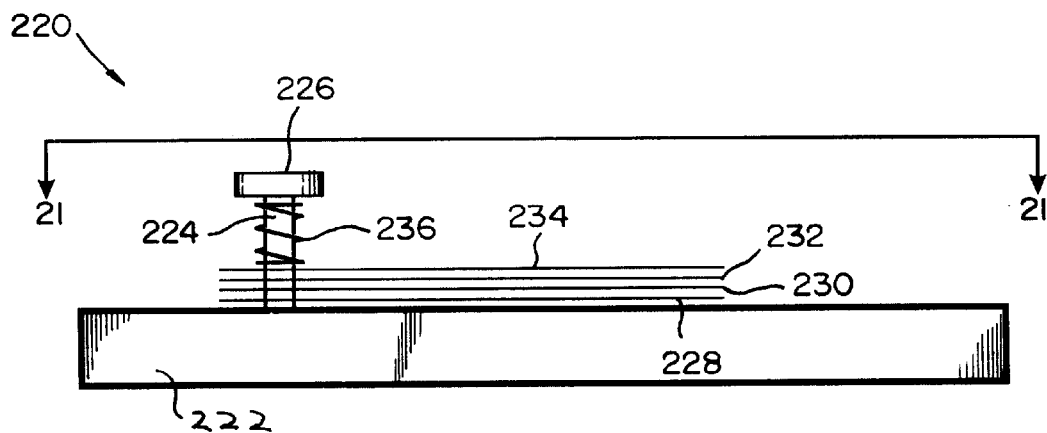
FIG. 20 is a side elevational view of a folding tool that may be used to form the accordion folded cell stack of FIGS. 17-19.
Figure 21:
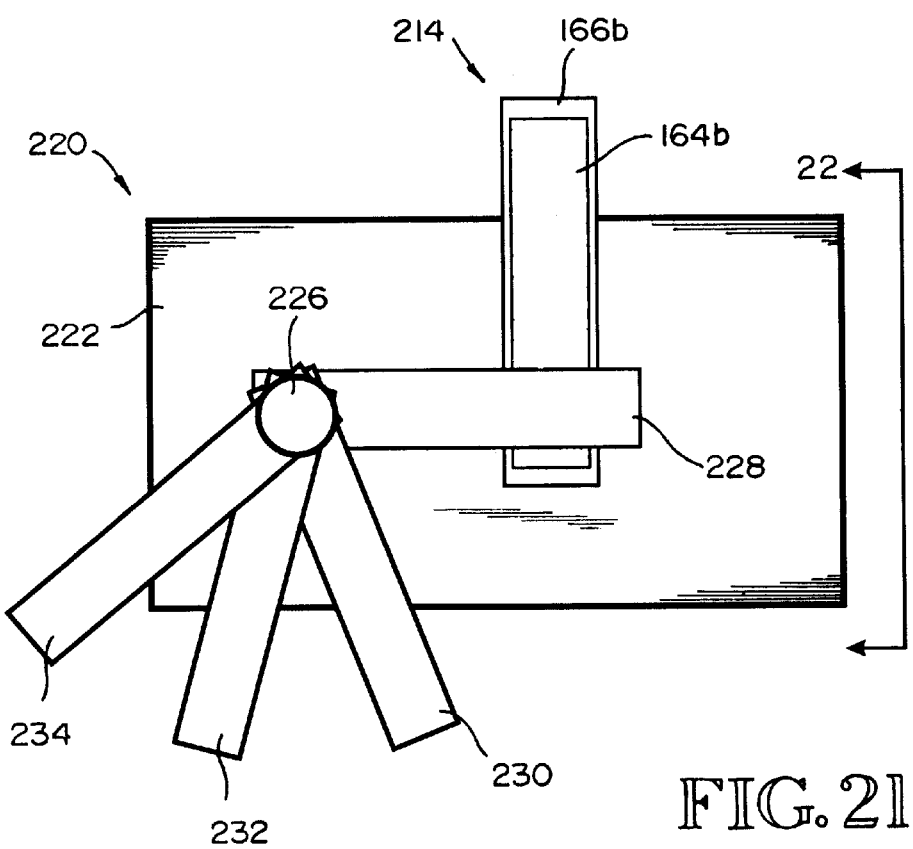
FIG. 21 is a top elevational view, taken along line 21—21 of FIG. 20, of the folding tool and the FIG. 16 cell sandwich, with the tool's arms shown rotated to various positions about the tool's post, for clarity.
Figure 22:
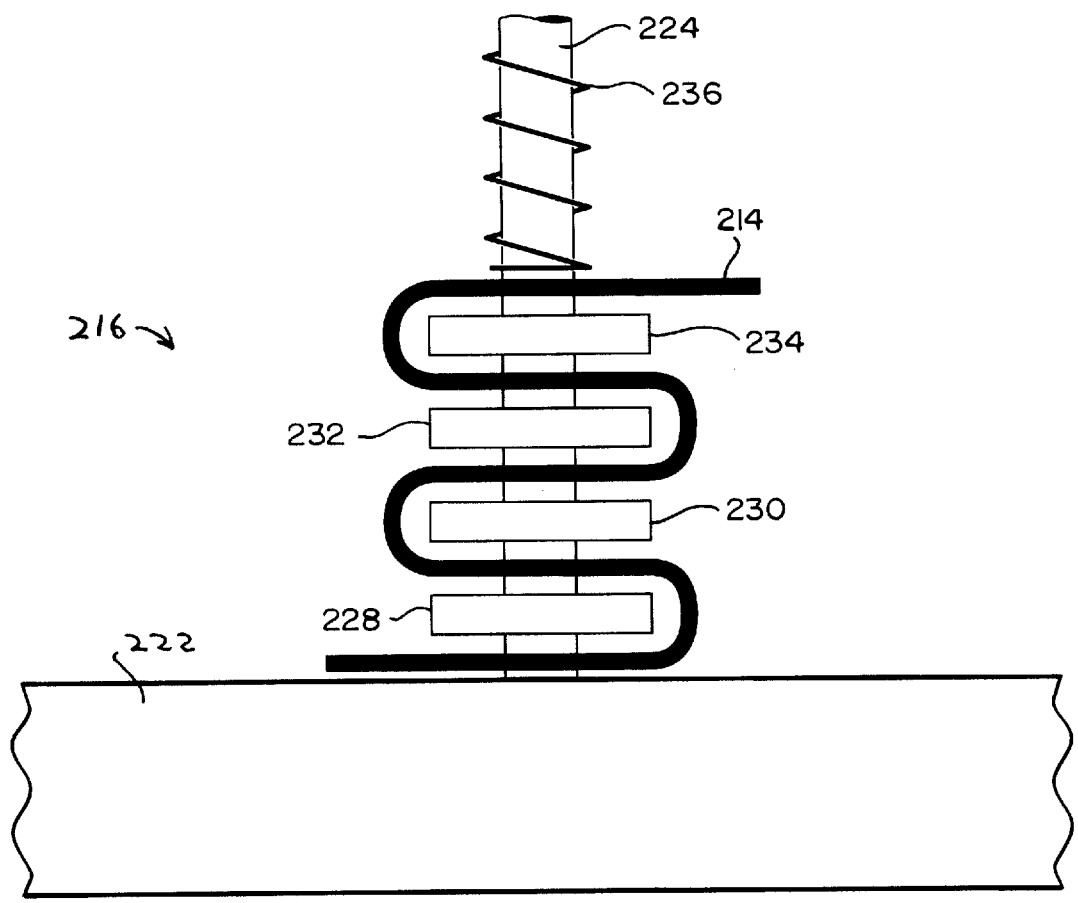
FIG. 22 is an end elevational view, partially broken away, taken along line 22—22 of FIG. 21, showing the accordion folded cell stack of FIGS. 17-19 being formed by the folding tool.

Turning now to FIGS. 20–22, a folding tool 220 is illustrated that may be used to fold the cell sandwich 214 into an accordion folded cell stack 216. The folding tool 220 may comprise a base 222; a post 224 secured to the base 222; a spring stop 226 mounted to the post 224; four arms 228–234, each arm being pivotally mounted to the post 224; and a compression spring 236 mounted on the post 224 between the spring stop 226 and the uppermost arm 234.

For clarity, spaces are shown between the arms 228–234, and between the bottom arm 228 and the base 222 in FIG. 20. However, when the folding tool 220 is not being used to fold the cell sandwich 214 into an accordion folded cell stack 216 such spaces may not actually exist, since the compression spring 236 may then tend to urge the arms 228–234 into contact with each other, and to urge the bottom arm 228 into contact with the base 222.

Although four arms 228–234 are illustrated, there may be fewer, or more such arms, depending on how many folds the accordion folded cell stack 216 may have. In general, there may be one arm 228–234 for each fold in the accordion folded cell stack 216.

As an alternative to the folding tool 220, any other suitable apparatus and method may be used to form the accordion folded cell stack 216 from the cell sandwich 214.

However, in order to form the accordion folded cell stack 216 by using the folding tool 220, the cell sandwich 214 may first be placed on the base 222, and the arm 228 may then be rotated on the post 224 until it lies over one end of the cell sandwich 214, as best seen in FIG. 21. Then, while the bottom arm 228 is held in place on the cell sandwich 214 by the force of the spring 236, the free portion of the cell sandwich may be bent 1800 back over the bottom arm 228, as best seen in FIG. 22.

The arm 230 may then be rotated on the post 224 until it lies over the cell sandwich 214 and the arm 228, as best seen in FIG. 22, at which time the free portion of the cell sandwich 214 may be bent 180° back over the arm 230. The remaining folds of the accordion folded cell stack 216 may then be formed in a similar manner by using the arms 232 and 234. After the accordion folded cell stack 216 has been formed by use of the folding tool 220, it may then be removed from the folding tool 220 by simply sliding it off from the free ends of the arms 228–234. After the accordion folded cell stack 216 has been removed from the tool 220, the spaces in the cell stack 216 that were formerly occupied by the arms 228–234 may be removed by simply compressing the cell stack 216 in any suitable way.

For clarity, spaces are shown in FIG. 22 between the arms 228–234 and the accordion folded cell stack 216. However, such spaces may not be expected to actually occur during use of the folding tool 220, since the compression spring 236 may be selected to be strong enough to push each arm 228–234 downwardly with a force sufficient to cause each arm 228–234 to be in contact with the portion of the cell stack 216 that is located beneath it.

After the accordion folded cell stack 216 has been formed, the battery 160b may be completed by first inserting the accordion folded cell stack 216 into the can 163b, and by then sealing the can 163b with the cover 178b and the insulating gasket 180b.

The rechargeable battery 160b of FIGS. 16–19 may be designed to have an external size, shape and volume that matches any conventional button cell battery. Alternatively, the rechargeable battery 160b may be made in any other external size, shape, and volume, within reason. For example, the battery 160b may be designed to have any other desired cross-sectional shape besides square or rectangular, such as circular. In such an event, the cathode 162b and the anode 164b may comprise a series of circular elements 168b joined by necks 170b, similar to the circular elements 168 and necks 170 of the battery 160 of FIGS. 10–12. If some other shape besides circular was desired, then the circular elements 168b may be selected to have a shape corresponding to the particular cross-sectional shape of the particular battery 160b under consideration.

The rechargeable battery 160b of FIGS. 16–19 may be designed so that its various electrical properties, such as its output voltage, internal resistance (or output impedance), and energy storage capacity, may have any desired values, within reason. Such desired values for the battery 160b may be obtained by suitably varying one or more of the pertinent factors, such as: (a) the number of cathode(s) 162b, anode(s) 164b and layers of electrolyte 166b that comprise the battery 160b; (b) when there are at least 2 cathodes 162b and at least two anodes 164b, (with their associated layers of electrolyte 166b), whether the multiple cathodes 162b are electrically connected in parallel and or in series with each other, and whether the multiple anodes 164b are electrically connected in parallel or in series with each other; (c) the shape, area and/or thickness of each of the battery 160b's cathode(s) 162b, anode(s) 164b, and layers of electrolyte 166b; (d) the materials from which each of the battery 160b's cathode(s) 162b, anode(s) 164b, and layers of electrolyte 166b are made; and/or (e) the manner in which the cathode(s) 162b, anode(s) 164b and layers of electrolyte 166b are accordion folded to form the accordion folded cell stack 216.

The battery 160b of FIGS. 16–19 may have a cathode 162b, an anode 164b, and layers of electrolyte 166b may be made, respectively, from any of the materials that were set forth above regarding the cathode 162, the anode 164 and the layers of electrolyte 166 for the battery 160 of FIGS. 10–12.

The battery 160b of FIGS. 16–19 may have a cathode 162b, an anode 164b, and layers of electrolyte 166b whose thicknesses, respectively, may be the same as the thicknesses set forth above regarding the cathode 162, the anode 164 and the layers of electrolyte 166 for the battery 160 of FIGS. 10–12.

As an alternative, the rechargeable battery 160b of FIGS. 16–19 may be a NiMH rechargeable battery. In general, the materials used for the cathode(s), anode(s) and/or layer(s) of electrolyte in any conventional NiMH rechargeable battery may be used, respectively, for the cathode(s) 162b, anode(s) 164b and/or layer(s) of electrolyte 166b in such a NiMH rechargeable battery 160b of the present invention.

EXAMPLE LITHIUM BASED RECHARGEABLE BATTERY 160b HAVING A CATHODE 162b AND AN ANODE 164b THAT ARE ACCORDION FOLDED WITH RESPECT TO EACH OTHER

By way of example, let it be assumed that a rechargeable battery 160b is to be designed that has an internal length and width of 11.0 mm, an external length and width of 11.3 mm, an internal height of 2.1 mm, an external height of 2.5 mm, an interior volume of 254 mm$^3$, and an exterior volume of 320 mm$^3$.

In addition, let it also be assumed that the rechargeable battery 160b is to have an internal resistance (or an output impedance) in the range of about 10–20 ohms, an energy storage capacity of about 6 mAh; and an output voltage that ranges from about 4 V when fully charged, down to about 2.5 V when nearly fully discharged, with an assumed loading of the cathode 162b and the anode 164b of 0.012 mAh/mm$^2$.

Let it be further assumed that the cathode 162b comprises a coating of LiCoO$_2$ on aluminum foil, that the anode 164b comprises a coating of carbon on copper foil, and that the layer of electrolyte 166b comprises a 1 M solution of LiClO$_4$ in PC-DMC (propylene carbonate-dimethoxycarbonate), with a 0.025 mm porous polypropylene separator film.

In order to fit within the internal volume of the above example battery 160b, and in order to simultaneously have the above specifications, then the example battery 160b's cathode 162b and the anode 164b may each have a width of about 9 mm, a length of about 45 mm, an area of about 405 mm², and a thickness of about 0.15 mm; and the layer of electrolyte 166b may have a width of about 11 mm, a length of about 49 mm, an area of about 539 mm², and a thickness of about 0.02 mm.

In order to form the accordion folded cell stack 216, the cell sandwich 214 may first be formed by centering the cathode 162b and the anode 164b with respect to the layer of electrolyte 166b. As a result of such centering, in the cell sandwich 214 the sides of the layer of electrolyte 166b may extend past the respective sides of the cathode 162b and the anode 164b by about 1 mm, and the ends of the layer of electrolyte 166b may extend past the respective ends of the cathode 162b and the anode 164b by about 2 mm.

Figure 18:
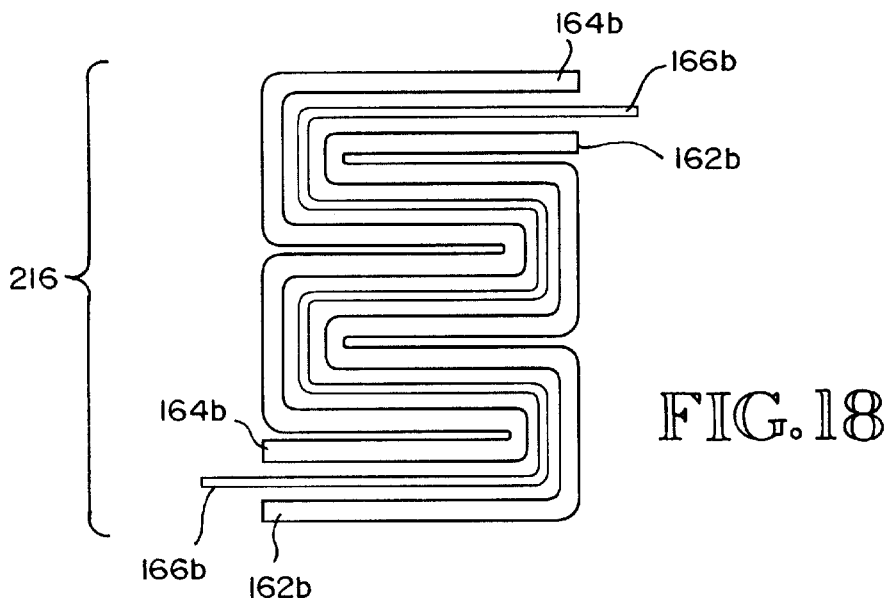
FIG. 18 is an end elevational view, taken along line 18—18 of FIG. 17, of the accordion folded cell stack.
Figure 19:
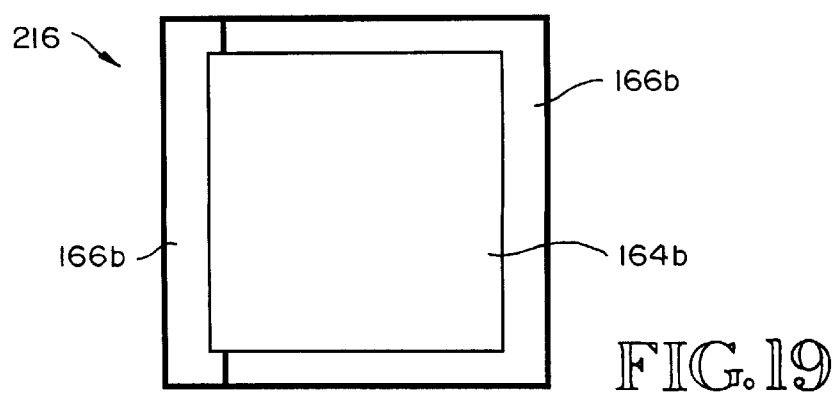
FIG. 19 is a top elevational view, taken along line 19—19 of FIG. 17, of the accordion folded cell stack.
Figure 17:
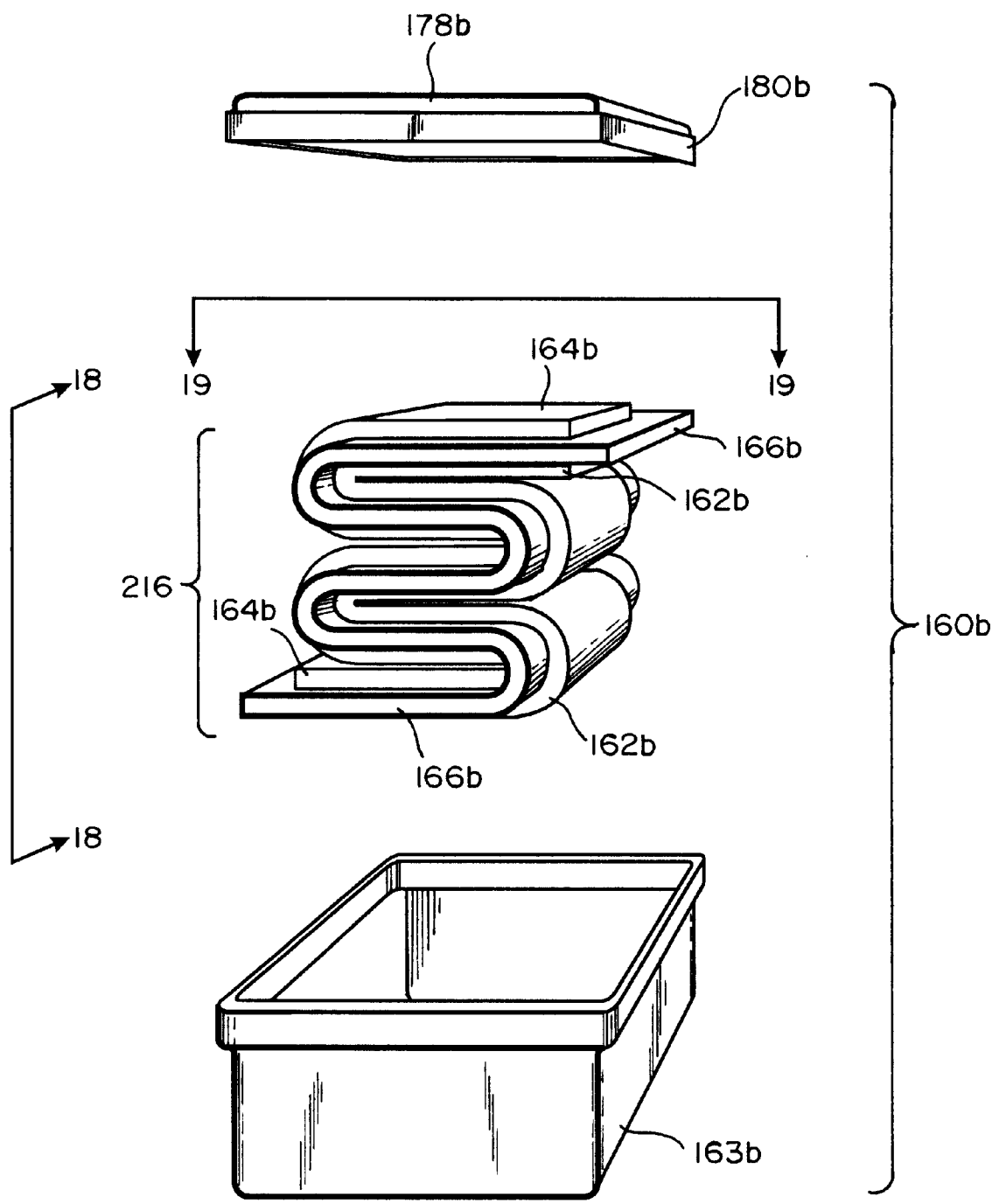
FIG. 17 is an exploded perspective view of a rechargeable button cell battery having an accordion folded cell stack formed from the FIG. 16 cell sandwich.

The accordion folded cell stack 216 may then be completed by accordion folding the cell sandwich 214 four times, as best seen in FIGS. 17–18. The resulting cell stack 216 may have an overall height of about 1.3 mm, an overall width of about 11 mm, and an overall length of about 11 mm. Thus, the overall footprint of the cell stack 216 may be about 121 mm²; and the overall volume of the cell stack 216 may be about 160 cubic mm.

After the cell stack 216 has been formed, the battery 160b may be completed by first inserting the cell stack 216 into the can 163b, and by then sealing the can 163b with the cover 178b and the insulating gasket 180b.

Such a battery 160b may have a specific energy of 19 Wh/kg (watt-hours per kilogram); and it may have an energy density of 62 Wh/l (watt-hours per liter).

Such a battery 160b has been subjected to long term discharge cycle tests at discharge depths of about 50%, i.e., for each discharge cycle the energy discharged out of the battery 160b was about 50% of its total original energy capacity in a fully charged state. During 500 such discharge cycles, which would be equivalent to more than one year's use of the battery 160b in a rechargeable hearing aid 10, 10a, the energy discharged out of the battery 160b was nearly 100% of the energy discharged out of the battery 160b when the tests were first started. In other words, there was no significant loss of energy storage capacity by the battery 160b despite being subjected to 500 discharge cycles. The importance of this accomplishment may be appreciated by comparison with typical NiCd rechargeable button cell batteries, which may be expected to experience a significant loss of energy storage capacity, on the order of about 20–60% during the course of 500 such discharge cycles.

It may be noted that it may be possible to increase the volumetric energy density of such a battery 160b from about 70 Wh/l to about 80 Wh/l by use of a battery 160b having a double anode 164b. Such double anodes are, in general, conventional. Such an energy density may be about twice that of a typical equivalent volume NiCd rechargeable hearing aid battery. This is important because it means that the battery 160b will power a hearing aid 10, 10a about twice as long as a conventional NiCd rechargeable battery.

It is understood that the foregoing forms of the invention were described and/or illustrated strictly by way of non-limiting example. In view of all of the disclosures herein, these and further modifications, adaptations and variations of the present invention will now be apparent to those skilled in the art to which it pertains, within the scope of the following claims.

What is claimed is:

1. An improved lithium based rechargeable battery; wherein said battery has an external volume of less than about 10 cubic centimeters; wherein said battery comprises a housing means, an alternately folded cell stack, and positive and negative electrical connections for said alternately folded cell stack; wherein said housing means is for holding said alternately folded cell stack and is for providing said positive and negative electrical connections for said alternatively folded cell stack;

wherein said alternately folded cell stack comprises a cathode, an anode, and layers of electrolyte; wherein said cathode and said anode are folded alternately over each other to form alternate layers of said cathode and said anode; wherein one of said layers of electrolyte is located between, and separates, an adjacent pair of said alternate layers of said cathode and said anode;

wherein said housing means comprises an entire external surface having an entire external surface area; wherein said entire external surface comprises at least one pair of parallel external faces that are at least generally parallel with respect to each other; wherein each said pair of parallel external faces has a respective combined external parallel surface area; and wherein a ratio of a largest said respective combined external parallel surface area to a difference between said entire external surface area and said largest said respective combined external parallel surface area is greater than about 0.5.

2. The battery according to claim 1, wherein said external volume of said battery is less than about 1 cubic centimeter.

3. The battery according to claim 1, wherein said battery has an output impedance in the range of about 1–10 ohms.

4. The battery according to claim 2, wherein said battery has an output impedance in the range of about 1–10 ohms.

5. The battery according to claim 1, wherein said housing means comprises a base having a base shape;

wherein said cathode comprises a strip of material comprising a pair of adjacent cathode elements and a cathode neck joining said pair of adjacent cathode elements; wherein said pair of adjacent cathode elements have a maximum width; wherein said cathode neck has a maximum width; wherein said maximum width of said cathode neck is substantially less than said maximum width of said pair of adjacent cathode elements;

wherein said anode comprises a strip of material comprising a pair of adjacent anode elements and an anode neck joining said pair of adjacent anode elements; wherein said pair of adjacent anode elements have a maximum width; wherein said anode neck has a maximum width; wherein said maximum width of said anode neck is substantially less than said maximum width of said pair of adjacent anode elements;

wherein said alternate layers of said cathode and said anode in said alternately folded cell stack comprise said pair of adjacent cathode elements and said pair of adjacent anode elements folded alternately over each other; and wherein each of said adjacent cathode elements and said adjacent anode elements have a respective shape that is at least similar to said base shape.

6. The battery according to claim 2, wherein said housing means comprises a base having a base shape;

wherein said cathode comprises a strip of material comprising a pair of adjacent cathode elements and a cathode neck joining said pair of adjacent cathode elements; wherein said pair of adjacent cathode elements have a maximum width; wherein said cathode neck has a maximum width; wherein said maximum width of said cathode neck is substantially less than said maximum width of said pair of adjacent cathode elements;

wherein said anode comprises a strip of material comprising a pair of adjacent anode elements and an anode neck joining said pair of adjacent anode elements; wherein said pair of adjacent anode elements have a maximum width; wherein said anode neck has a maximum width; wherein said maximum width of said anode neck is substantially less than said maximum width of said pair of adjacent anode elements;

wherein said alternate layers of said cathode and said anode in said alternately folded cell stack comprise said pair of adjacent cathode elements and said pair of adjacent anode elements folded alternately over each other; and wherein each of said adjacent cathode elements and said adjacent anode elements have a respective shape that is at least similar to said base shape.

7. The battery according to claim 5, wherein said base shape and said shape of each of said adjacent cathode elements and said adjacent anode elements are all at least substantially circular.

8. The battery according to claim 6, wherein said base shape and said shape of each of said adjacent cathode elements and said adjacent anode elements are all at least substantially circular.

9. The battery according to claim 5, wherein each of said adjacent cathode elements and said adjacent anode elements comprises a respective top face and a respective bottom face;

wherein two of said layers of electrolyte are located, respectively, adjacent said top and bottom faces of at least one of said adjacent cathode elements and said adjacent anode elements;

wherein said two layers of electrolyte have a shape that is at least substantially the same as said shape of said at least one of said adjacent cathode elements and said adjacent anode elements; and wherein said two layers of electrolyte have edges which are heat sealed together in said shape that is at least substantially the same as said shape of said at least one of adjacent cathode elements,and said adjacent anode elements.

10. The battery according to claim 6, wherein each of said adjacent cathode elements and said adjacent anode elements comprises a respective top face and a respective bottom face;

wherein two of said layers of electrolyte are located, respectively, adjacent said top and bottom faces of at least one of said adjacent cathode elements and said adjacent anode elements;

wherein said two layers of electrolyte have a shape that is at least substantially the same as said shape of said at least one of said adjacent cathode elements and said adjacent anode elements; and wherein said two layers of electrolyte have edges which are heat sealed together in said shape that is at least substantially the same as said shape of said at least one of adjacent cathode elements and said adjacent anode elements.

11. An improved lithium based rechargeable battery; wherein said battery has an external volume of less than about one cubic centimeter; wherein said battery comprises a housing means, a spiral wrapped cell stack, and positive and negative electrical connections for said spiral wrapped cell stack; wherein said housing means is for holding said spiral wrapped cell stack and is for providing said positive and negative electrical connections for said spiral wrapped cell stack;

wherein said spiral wrapped cell stack comprises a cathode, a first layer of electrolyte, an anode, and a second layer of electrolyte; wherein said cathode, said first layer of electrolyte, said anode, and said second layer of electrolyte are wound on top of each other to form concentric, alternating layers of said cathode, said first layer of electrolyte, said anode, and said second layer of electrolyte; wherein said cathode and said anode are separated by said first and second layers of electrolyte;

wherein said housing means comprises an entire external surface having an entire external surface area; wherein said entire external surface comprises at least one pair of parallel external faces that are at least generally parallel with respect to each other; wherein each said pair of parallel external faces has a respective combined external parallel surface area; and wherein a ratio of a largest said respective combined external parallel surface area to a difference between said entire external surface area and said largest said respective combined external parallel surface area is greater than about 0.5.

12. The battery according to claim 11, wherein said battery has an output impedance in the range of about 1–10 ohms.

13. The battery according to claim 11, wherein said anode comprises a strip of material having an end; wherein said spiral wrapped cell stack has an axis; wherein said battery further comprises an anode rod secured to said end of said anode; wherein said anode rod is located on said axis of said spiral wrapped cell stack; and wherein said spiral wrapped cell stack is wrapped around said anode rod.

14. The battery according to claim 13, wherein said housing means comprises a can and a cover for said spiral wrapped cell stack; and wherein said anode rod is an integrally formed part of said cover.

15. The battery according to claim 13, wherein said housing means comprises a can and a cover for said spiral wrapped cell stack; and wherein said anode rod is secured to said cover.

16. The battery according to claim 11, wherein said cathode comprises a strip of material having an end; wherein said spiral wrapped cell stack has an axis; wherein said battery further comprises an cathode rod secured to said end of said cathode; wherein said cathode rod is located on said axis of said spiral wrapped cell stack; and wherein said spiral wrapped cell stack is wrapped around said cathode rod.

17. The battery according to claim 13, wherein said housing means comprises a can and a cover for said spiral wrapped cell stack; and wherein said cathode rod is integrally formed as part of said cover.

18. The battery according to claim 13, wherein said housing means comprises a can and a cover for said spiral wrapped cell stack; and wherein said cathode rod is secured to said cover.

19. An improved lithium based rechargeable battery; wherein said battery has an external volume of less than about one cubic centimeter; wherein said battery comprises a housing means, an accordion folded cell stack, and positive and negative electrical connections for said accordion folded cell stack; wherein said housing means is for holding said accordion folded cell stack and is for providing said positive and negative electrical connections for said accordion folded cell stack;

wherein said accordion folded cell stack comprises a cathode, an anode, and a layer of electrolyte located between said cathode and said anode; wherein said layer of electrolyte separates said cathode and said anode; wherein said cathode and said anode are accordion folded over each other;

wherein said housing means comprises an entire external surface having an entire external surface area; wherein said entire external surface comprises at least one pair of parallel external faces that are at least generally parallel with respect to each other; wherein each said pair of parallel external faces has a respective combined external parallel surface area; and wherein a ratio of a largest said respective combined external parallel surface area to a difference between said entire external surface area and said largest said respective combined external parallel surface area is greater than about 0.5.

20. The battery according to claim 19, wherein said battery has an output impedance in the range of about 10–20 ohms.

* * * * *